(12) United States Patent
Imaichi et al.

(10) Patent No.: US 8,256,244 B2
(45) Date of Patent: Sep. 4, 2012

(54) METHOD FOR BENDING A GLASS SHEET AND APPARATUS FOR BENDING A GLASS SHEET

(75) Inventors: Akio Imaichi, Chiyoda-ku (JP); Junji Hori, Chiyoda-ku (JP); Takashi Hirotsu, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 130 days.

(21) Appl. No.: 12/257,943

(22) Filed: Oct. 24, 2008

(65) Prior Publication Data
US 2009/0084138 A1 Apr. 2, 2009

Related U.S. Application Data

(63) Continuation of application No. PCT/JP2007/058981, filed on Apr. 25, 2007.

(30) Foreign Application Priority Data

Apr. 25, 2006 (JP) ................................. 2006-121039

(51) Int. Cl.
*C03B 23/02* (2006.01)
(52) U.S. Cl. .......................................... 65/106; 65/287
(58) Field of Classification Search .................... 65/106, 65/287
See application file for complete search history.

(56) References Cited

U.S. PATENT DOCUMENTS 4,737,182 A 4/1988 Fecik et al.
4,778,507 A 10/1988 Aruga et al.
4,781,745 A 11/1988 Mumford
5,092,916 A 3/1992 McMaster
(Continued)

FOREIGN PATENT DOCUMENTS
EP 1 550 639 A1 7/2005
(Continued)

OTHER PUBLICATIONS

U.S. Appl. No. 12/792,868, filed Jun. 3, 2010, Fukami, et al.

*Primary Examiner* — Matthew Daniels
*Assistant Examiner* — Russell Kemmerle, III
(74) *Attorney, Agent, or Firm* — Oblon, Spivak, McClelland, Maier & Neustadt, L.L.P.

(57) ABSTRACT

The present invention relates to a method or an apparatus for bending a plate-like material such as a glass sheet for a side window having a double-curved surface for automobiles wherein the positioning of support frame and forming mold is performed with high precision.
There are a forming step for placing a glass sheet on a forming support frame and pressing the glass sheet placed thereon against a forming surface of forming mold to bend the glass sheet and a conveyance step for transferring the formed glass sheet onto a conveyance support frame (the forming support frame can be used as a conveyance support frame) for conveying the glass sheet wherein the forming step includes a forming position correcting step for correcting a displacement of press position with respect to the forming support frame and a forming mold at the time of pressing the glass sheet against the forming mold, and the conveyance step includes a transfer position correcting step for correcting a displacement of transfer position of the glass sheet with respect to the forming mold and the conveyance support frame at the time of transferring the formed glass sheet onto the conveyance support frame.

26 Claims, 13 Drawing Sheets

U.S. PATENT DOCUMENTS

| | | |
|---|---|---|
| 5,645,621 A | 7/1997 | Sykes |
| 5,906,668 A | 5/1999 | Mumford et al. |
| 2004/0107729 A1* | 6/2004 | Fukami et al. ............... 65/25.4 |
| 2005/0138967 A1 | 6/2005 | Hori et al. |
| 2008/0060386 A1* | 3/2008 | Kanno et al. ................. 65/289 |

FOREIGN PATENT DOCUMENTS

| | | |
|---|---|---|
| JP | 63-156025 A | 6/1988 |
| JP | 3-271126 A | 12/1991 |
| JP | 6-247728 A | 9/1994 |
| JP | 2005-206458 A | 8/2005 |

* cited by examiner

FIG. 9

METHOD FOR BENDING A GLASS SHEET AND APPARATUS FOR BENDING A GLASS SHEET

TECHNICAL FIELD

The present invention relates to a method for bending a glass sheet and an apparatus for bending a glass sheet. In particular, it relates to a method and an apparatus for bending a plate-like material such as a window glass and so on for automobiles.

BACKGROUND ART

For recent window glass for automobiles, curved glass having various shapes and curvatures is required in complying with a change in design. As a technique to produce such curved glass, there is a press forming method to be conducted in a heating furnace. This method is suitable as a method for producing curved glass having a complicated shape or a deep-set shape because a glass sheet can be bent under elevated temperature.

Heretofore, in the press forming method for bending a glass sheet in a heating furnace, there has been known a forming apparatus wherein a support frame is used as a lower mold on which the glass sheet is placed; in preforming the glass sheet before press-forming, the glass sheet is deformed due to its own weight and then, the glass sheet is pressed against a forming surface of forming mold.

In this bend forming apparatus, the glass sheet heated to nearly its softening point while it is conveyed in the heating furnace by means of rollers, is placed on the support frame by means of a transfer machine having a positioning mechanism. The support frame holding the glass sheet moves to a downstream pressing section where the glass sheet is pressed between an upper forming mold and the lower support frame to be bent in a predetermined curved shape.

In this case, it is necessary to determine the position between the upper forming mold and the lower support frame with high precision in the pressing section. Heretofore, as the method for positioning (aligning) the upper forming mold and the lower support frame, there has been known such a technique that positioning pins are formed in the upper forming mold so as to extend to the support frame, sockets are provided in the lower support frame, and the positioning of the forming mold to the support frame is performed by fitting the positioning pins into the sockets.

As another method, there is proposed such a method as described in, for Example, JP-A-6-247728. According to this method, a sensor is provided on a forming mold, an object to be detected by this sensor is provided on a support frame, a displacement of position between the forming mold and the support frame at the time of positioning is detected by the detecting means comprising said sensor and said object to be detected, and the support frame is moved based on the displacement detected, whereby the position determination is conducted with high precision.

DISCLOSURE OF THE INVENTION

Problems to be Solved by the Invention

In recent years, to control voluntarily a glass deformation volume during manufacturing processes, an apparatus for bending a glass sheet, comprising a preforming mold and a preforming support frame is proposed. By preforming a glass sheet in this preforming apparatus before full-forming, it can be bent in a predetermined curved shape with high precision in a full-forming step.

In this bending apparatus comprising the forming mold and the support frame which perform preforming, and the forming mold and the support frame which perform full-forming, however, the position determination between the preforming support frame and preforming mold at the time of preforming, the position determination between the preforming mold and the full-forming support frame at the time of transferring a glass sheet held by the preforming mold onto the full-forming support frame and the position determination between the full-forming support frame and the full-forming mold are required respectively.

Further, for a glass sheet having a complicated shape, the position determination with high precision is needed at the time of air-cooling/tempering and accordingly, the position determination between the full-forming mold and a conveyance support frame at the time of transferring a glass sheet held by the full-forming mold onto the conveyance support frame is also needed for conducting air-cooling/tempering.

Thus, in the conventional position determination method using the positioning pins and the sockets, there was a problem as follows. Since a correction amount in correcting the position between the preforming support frame and the preforming mold at the time of preforming is different from a correction amount in correcting the position between the preforming mold and the full-forming support frame at the time of conveying after the preforming, collisions of the positioning pins to the sockets took place in repeated corrections of position whereby these members were worn.

Similarly, since a correction amount in correcting the position with respect to the full-forming support frame and the full-forming mold at the time of full-forming is different from a correction amount in correcting the position between the full-forming mold and the conveyance support frame at the time of conveying after the full-forming, there was a problem that collisions between the positioning pins and the sockets took place whereby the both members were worn. When these members are worn, precision of correction decreases by an amount of wearing.

In the method using the sensor and the object to be detected, the position determination was conducted only between each forming mold and each forming support frame, and the position determination between a forming mold and any of two support frames was not considered. Namely, in a conventional apparatus for bending a glass sheet in a simple shape, the operation for pressing a glass sheet against a forming mold was only once, and accordingly, the position determination with high precision was unnecessary when a glass sheet is placed on a conveyance support frame after the pressing.

The present invention has been made in view of the above-mentioned points and it is an object of the present invention to provide a method and an apparatus for bending a glass sheet, which can determine the position between a support frame and a forming mold with high precision.

Means for Solving the Problems

In order to solve the above-mentioned problems, the present invention takes various features as follows.

In accordance with the present invention, there is provided a method for bending a glass sheet, comprising a forming step for placing a glass sheet softened by heating between a forming support frame and a forming surface of forming mold, and pressing the glass sheet with the forming support frame and the forming surface of forming mold to bend the glass sheet in a predetermined curved shape, and a transferring step for holding the glass sheet of predetermined curved shape on a forming mold and transferring the glass sheet from the forming mold to a conveyance support frame for supporting an edge portion of the glass sheet to convey to a next step, the method being characterized in that the forming step includes a forming position correcting step for correcting a displacement of press position with respect to the forming support frame and the forming mold by moving the position of forming mold at the time of pressing the glass sheet with the forming support frame and the forming mold, and that the transferring step includes a transfer position correcting step for correcting a displacement of transfer position of the glass sheet with respect to the forming mold and the conveyance support frame by moving the position of forming mold at the time of transferring the glass sheet of predetermined curved shape onto the conveyance support frame.

According to this invention, the displacement of press position between the forming support frame and the forming mold is corrected by conducting the forming position correcting step in the forming step, whereby it is possible to bend the glass sheet with high precision.

Further, by conducting the transfer position correcting step in the transfer step, the displacement of transfer position of the glass sheet with respect to the forming mold and the transfer support frame at the time of transferring the glass sheet bent in a predetermined curved shape onto the conveyance support frame, is corrected whereby it is possible to transfer the glass sheet, even when it has a complicated shape, onto the conveyance support frame correctly.

Further, in either the forming step or the transferring step, the correction of position is conducted by moving the position of the forming mold. Accordingly, a strong contact between the positioning pins and the socket can be eliminated even when the method of position determination with the position determining pins and sockets is used, whereby the wearing of the position determining pins and sockets can be suppressed. The position of the forming mold means the position of the forming mold in terms of a conveyance direction as a horizontal component, a direction perpendicular to the conveying direction and a direction of rotation.

Further, in this invention, it is preferable that the forming position correcting step includes a step for calling the press position with respect to the forming support frame and the forming mold, memorized in a first memory device, to correct the position of the forming mold and detecting newly a displacement of press position to renew the press position memorized in the first memory device, and the transfer position correcting step includes a step for calling the transfer position of the glass sheet with respect to the forming mold and the conveyance support frame, memorized in a second memory device, to correct the position of the forming mold and detecting newly a displacement of transfer position to renew the transfer position memorized in the second memory device.

In this forming position correcting step, when a displacement of press position is detected newly, the data of detected press position are renewed as a new press position in the first memory means, and in the next forming position correcting step, the correction of press position is conducted based on the renewed press position. Accordingly, the forming mold can be moved to the previous position of correction before the press position is renewed. Even when the movement of the forming mold in the previous correction does not reach a predetermined travel distance due to a mechanical error or the like, it will approach a center value every time corrections are repeated whereby a high precision position determination can be achieved.

Similarly, in the transfer position correcting step, it is possible to move the forming mold to the previous position of transfer before the displacement of transfer position is detected. Accordingly, when a displacement of transfer position is detected newly, the data of detected transfer position are renewed as a new transfer position in the second memory means and in the next transfer position correcting step, correction is conducted based on the renewed transfer position. Accordingly, the forming mold can be moved to the previous position of correction before the transfer position is renewed whereby a high precision correction treatment can be conducted. The first memory means and the second memory means may be provided separately or a single memory means may be provided to take roles of the first memory means and the second memory means.

Further, in the present invention, it is preferable that the step for renewing the press position in the forming position correcting step is a step for detecting a displacement of press position of the glass sheet by fitting pins provided in the forming mold to sockets provided in the forming support frame at the time of pressing the glass sheet with the forming support frame and the forming surface of forming mold, pressing the glass sheet against the forming surface of forming mold while the position of the forming mold is corrected, and memorizing a renewed press position in the first memory device, and the transfer position correcting step includes a step for detecting a displacement of transfer position of the glass sheet by fitting pins provided in the forming mold to sockets provided in the conveyance support frame at the time of transferring the glass sheet of predetermined curved shape, held on the forming surface of forming mold, onto the conveyance support frame, transferring the glass sheet of predetermined curved shape onto the conveyance support frame while the position of the forming mold is corrected and memorizing a renewed transfer position in the second memory device.

According to this, by fitting the pins to the sockets, the forming mold can forcibly be positioned at a desire position even when the movement of the forming mold by the correction does not reach a desired travel distance due to a mechanical error or the like. Further, since data in the first memory means and the second memory means are renewed respectively with newly detected press position and transfer position, it will approach a center value every time corrections are repeated whereby the wearing of pins and sockets can be reduced and a high precision position determination can be maintained continuously. When pins are provided in the forming mold, sockets are provided in the forming support frame and the conveyance support frame. On the other hand, when sockets are provided in the forming mold, pins are provided in the forming support frame and the conveyance support frame.

Further, in the present invention, it is preferable that in the forming position correcting step and the transfer position correcting step, the position of the forming mold is corrected by controlling actuators connected to the forming mold at its four positions via each sliding mechanism capable of sliding in two directions perpendicular to each other so that the forming mold is moved and/or rotated in a horizontal direction.

In the forming position correcting step and the transfer position correcting step, since the position of the forming mold is corrected by controlling actuators connected to the forming mold at its four positions via a sliding mechanism capable of sliding in two directions perpendicular to each other, the forming mold can be moved and/or rotated in a horizontal direction. Accordingly, the forming mold, even it is heavy, can be moved and/or rotated in a horizontal direction with high precision.

Further, in the present invention, it is preferable that in the forming position correcting step and the transfer position correcting step, the position of the forming mold is corrected by controlling a first actuator connected to a position in the forming mold at a side of the direction of conveyed glass sheet via a sliding mechanism capable of sliding in two directions perpendicular to each other and a second actuator connected to a position in the forming mold at a side opposing to the first actuator via a sliding mechanism capable of sliding in a direction perpendicular to the direction of conveyed glass sheet so that the forming mold is moved and/or rotated in a direction perpendicular to the direction of conveyed glass sheet, and the displacement of a component in the direction of conveyed glass sheet is corrected by adjusting the stop position of the forming support frame or the conveyance support frame.

With this, the position of the forming mold is corrected by controlling the first actuator and the second actuator so that the forming mold is moved and/or rotated horizontally in a direction perpendicular to the glass sheet conveyance direction. Accordingly, the forming mold, even it is heavy, can be moved and/or rotated in a horizontal direction with high precision. By adjusting the stop position of the forming support frame or the conveyance support frame, the position of the glass sheet in a component of transfer direction is corrected whereby the correction of position of the forming mold can be simplified.

Further, in the present invention, the forming step is carried out plural times, and the conveyance support frame in the transfer step is used as a forming support frame in the next forming step so that a series of forming step and transfer step is repeated plural times.

By repeating the forming step and the transfer step plural times, the glass plate can be bent with high precision even when the glass sheet has a complicated shape of curvature. In this case, in an early stage of forming step, a glass sheet is bent into a predetermined shape which does not yet reach a final shape, and in a final stage of forming step, the glass sheet is bent in desired shape.

Further, according to an invention, there is provided a method for bending a glass sheet, comprising a heating step for softening a glass sheet by heating, a preforming step for placing the softened glass sheet on a preforming support frame for supporting an edge portion of the glass sheet and pressing the glass sheet against a forming surface of preforming mold in a state of being placed on the preforming support frame to bend the glass sheet in a predetermined provisionally curved shape, a full-forming step for holding the glass sheet of provisionally curved shape on a preforming mold, transferring the glass sheet onto a full-forming support frame for supporting an edge portion of the glass sheet and pressing the glass sheet against a forming surface of full-forming mold in a state of being placed on a full-forming support frame to bend the glass sheet in a finally curved shape, and a conveyance step for holding the glass sheet of finally curved shape on a full-forming mold, transferring the glass sheet onto a conveyance support frame for supporting an edge portion of the glass sheet and conveying the glass sheet of finally curved shape in a state of being placed on the conveyance support frame, the method being characterized in that the preforming step includes a preforming position correcting step for correcting a displacement of press position with respect to the preforming support frame and the preforming mold by moving the position of preforming mold at the time of pressing the glass sheet against the preforming mold, and the full-forming step includes a first transfer position correcting step for correcting a displacement of transfer position of the glass sheet with respect to the preforming mold and the full-forming frame by moving the position of preforming mold at the time of transferring the glass sheet of provisionally curved shape onto the full-forming support frame, and a full-forming position correcting step for correcting a displacement of press position with respect to the full-forming support frame and the full-forming mold by moving the position of full-forming mold at the time of pressing the glass sheet of provisionally curved shape against the full-forming mold.

According to this invention, since the preforming position correcting step is carried out in the preforming step, the displacement of press position between the preforming support frame and the preforming mold can be corrected whereby it is possible to carry out a highly precise preforming process to a glass sheet.

Further, since the first transfer position correcting step is carried out in the full-forming step, the displacement of transfer position of a glass sheet of previously curved shape with respect to the preforming mold and the full-forming frame at the time of transferring the glass sheet onto the full-forming support frame is corrected whereby it is possible to transfer the glass sheet onto the full-forming mold with high precision.

In addition, since the full-forming position correcting step is carried out in the full-forming step, the displacement of press position between the full-forming support frame and the full-forming mold at the time of pressing a glass sheet bent in a provisionally curved shape against the full-forming mold is corrected whereby it is possible to carry out a full-forming process to the glass sheet with high precision.

In this invention, it is preferable that the conveyance step includes a second transfer position correcting step for correcting a displacement of transfer position of the glass sheet with respect to the full-forming mold and the conveyance frame by moving the position of full-forming mold at the time of transferring the glass sheet of finally curved shape onto the conveyance support frame.

With this, since the second transfer position correcting step is carried out in the conveyance step, the displacement of transfer position of the glass sheet of finally curved shape with respect to the full-forming mold and the conveyance frame at the time of transferring the glass sheet onto the conveyance support frame whereby it is possible to transfer the glass sheet of finally curved shape onto the conveyance support frame with high precision.

Further, in accordance with another invention, there is provided an apparatus for bending a glass sheet, comprising a forming means having a forming support frame and a forming mold for placing a glass sheet softened by heating, between one another, and pressing the glass sheet to bend the glass sheet in a predetermined curved shape, and a conveyance means for conveying the glass sheet of predetermined curved shape, the conveyance means having a conveyance support frame for holding thereon the glass sheet of predetermined curved shape and supporting its edge portion, the apparatus being characterized in that the forming means includes a forming position detecting means for detecting a displacement of press position with respect to the forming support frame and the forming mold at the time of pressing the glass sheet against the forming mold, a transfer position detecting means for detecting a displacement of transfer position of the glass sheet with respect to the forming mold and the conveyance support frame at the time of transferring the glass sheet of predetermined curved shape onto the conveyance support frame and a movable means for moving and/or rotating the forming mold, and that there is provided a control means for controlling the movable means in response to a displacement of position detected by the forming position detecting means so that the forming mold is moved and/or rotated to cancel the displacement of position, and controlling the movable means in response to a displacement of position detected by the transfer position detecting means so that the forming mold is moved and/or rotated to cancel the displacement of position.

According to this invention, the control means controls the movable means in response to a displacement of position detected by the forming position detecting means to move and/or rotate the forming mold to cancel the displacement of position. Accordingly, the displacement of press position between the forming support frame and the forming mold can be corrected and it is possible to carry out a highly precise bending process to a glass sheet.

Further, the control means controls the movable means in response to a displacement of position detected by the transfer position detecting means to move and/or rotate the forming mold to cancel the displacement of position. Accordingly, the displacement of transfer position of the glass sheet with respect to the forming mold and the conveyance support frame can be corrected and it is possible to transfer the glass sheet onto the conveyance support frame certainly.

In this invention, further, it is preferable that the control means has a memory means for memorizing a displacement of press position detected by the forming position detecting means and a displacement of transfer position detected by the transfer position detecting means so that the forming mold is moved and/or rotated on the basis of displacements of position called from the memory device.

Accordingly, when a displacement of press position is detected newly, the memory means is renewed with the detected displacement of position whereby it is possible to carry out a treatment of correction based on this renewed press position in the next position correcting treatment. Therefore, the forming mold can be moved to the previous position of correction before renewing the press position. Even when the forming mold does not reach a desired travel distance in the previous treatment of correction due to a mechanical error or the like, it approaches a center value every time corrections are repeated whereby a highly precise position determination can be achieved.

Further, in this invention, it is preferable that the forming mold is provided with pins, and the forming support frame and the conveyance support frame are respectively provided with sockets to be fitted with the pins.

Accordingly, by fitting the pins to the sockets, the position of the forming mold can be determined forcibly at a desired position even when the movement of the forming mold by the correction does not reach a predetermined travel distance due to a mechanical error or the like. When the pins are provided on the forming mold, the sockets are provided on the forming support frame and the conveyance support frame. On the contrary, when the sockets are provided on the forming mold, the pins are provided on the forming support frame and the conveyance support frame.

Further, in this invention, it is preferable that the movable means comprises actuators connected to the forming mold at four positions via sliding mechanisms capable of sliding in two directions perpendicular to each other.

Since the moving means comprises actuators connected to the forming mold at its four positions via the sliding mechanisms capable of sliding in two directions perpendicular to each other, the forming mold of heavy load can be moved easily in a horizontal direction and a rotating direction with high precision, in spite of a simple structure.

In this invention, it is preferable that the movable means comprises a first actuator connected to a position in the forming mold at a side of glass sheet conveyance direction via a sliding mechanism capable of sliding in a direction perpendicular to each other and a second actuator connected to the forming mold at a side opposing to the first actuator via a sliding mechanism capable of sliding in a direction perpendicular to the glass sheet conveyance direction.

Accordingly, with two actuators of the first and second actuators, the forming mold of heavy load can be moved easily and accurately in a horizontal direction and a rotating direction. Further, since the correction of position to the glass sheet in a conveyance direction is carried out at the stop position of the support frame, the equipment at a forming mold side can be simplified.

Further, in this invention, forming means are provided in plural stages and a conveyance support frame in a conveyance means is used as a forming support frame so that there are plural stages comprising a series of forming means and conveyance means.

Since the forming means are provided in plural stages, it is possible to carry out the bending process with high precision even when a glass sheet of complicatedly curved shape is to be formed.

According to another invention, there is provided an apparatus for bending a glass sheet, comprising a heating means for softening a glass sheet, a preforming means for bending the glass sheet in a predetermined provisionally curved shape, comprising a preforming support frame for holding the softened glass sheet by supporting its edge portion and a preforming mold for pressing the glass sheet held on the preforming support frame, a full-forming means for bending the glass sheet in a finally curved shape, comprising a full-forming support frame for holding the glass sheet of provisionally curved shape by supporting its edge portion and a full-forming mold for pressing the glass sheet, and a conveyance means for conveying the glass sheet of finally curved shape, comprising a conveyance support frame for holding the glass sheet of finally curved shape by supporting its edge portion, the apparatus being characterized in that the preforming means further comprises a preforming position detecting means for detecting a displacement of press position with respect to the preforming support frame and the preforming mold at the time of pressing the glass sheet against the preforming mold, a first transfer position detecting means for detecting a displacement of transfer position of the glass sheet with respect to the preforming mold and the full-forming support frame at the time of transferring the glass sheet of provisionally curved shape onto the full-forming support frame, and a preforming movable means for moving and/or rotating the preforming mold, and the full-forming means further comprises a full-forming position detecting means for detecting a displacement of press position with respect to the full-forming support frame and the full-forming mold at the time of pressing the glass sheet of provisionally curved shape against the full-forming mold, and a full-forming movable means for moving and/or rotating the full-forming mold, and that there is provided a preforming control means for controlling the preforming movable means in response to a displacement of position detected by the preforming position detecting means so that the preforming mold is moved and/or rotated to cancel the displacement of position, and controlling the preforming movable means in response to a displacement of position detected by the first transfer position detecting means so that the preforming mold is moved and/or rotated to cancel the displacement of position and a full-forming control means for controlling the full-forming movable means in response to a displacement of position detected by the full-forming position detecting means so that the full-forming mold is moved and/or rotated to cancel the displacement of position.

According to this invention, since the preforming control means controls the preforming movable means in response to a displacement of position detected by the preforming position detecting means so that the preforming mold is moved and/or rotated to cancel the displacement of position, the displacement of press position with respect to the preforming support frame and the preforming mold can be corrected, and it is possible to carry out the bending process to a glass sheet with high precision.

Further, since the preforming control means controls the preforming movable means in response to a displacement of position detected by the first transfer position detecting means so that the preforming means is moved and/or rotated to cancel the displacement of position, the displacement of transfer position of the glass sheet with respect to the preforming mold and the full-forming support frame can be corrected, and it is possible to transfer the glass sheet onto the full-forming support frame certainly.

Further, since the full-forming control means controls the full-forming movable means in response to a displacement of position detected by the full-forming position detecting means so that the full-forming mold is moved and/or rotate to cancel the displacement of position, the displacement of transfer position of the glass sheet with respect to the full-forming mold and the full-forming support frame can be corrected, and it is possible to transfer the glass sheet onto the full-forming support frame certainly.

Further, in this invention, it is preferable that the full-forming means includes a second transfer position detecting means for detecting a displacement of transfer position of the glass sheet with respect to the full-forming mold and the conveyance support frame at the time of transferring the glass sheet of finally curved shape onto the conveyance support frame, and the full-forming control means controls the full-forming movable means in response to a displacement of position detected by the second transfer position detecting means so that the full-forming mold is moved and/or rotated to cancel the displacement of position.

Accordingly, since the full-forming control means controls the full-forming movable means in response to a displacement of position detected by the second transfer position detecting means so that the full-forming mold is moved and/or rotate to cancel the displacement of position, the displacement of transfer position of the glass sheet with respect to the full-forming mold and the conveyance frame at the time of transfer the glass sheet of finally curved shape onto the conveyance support frame can be corrected and accordingly, it is possible to transfer the glass sheet of finally curved shape onto the conveyance support frame with high precision.

Effects of the Invention

According to the present invention, even in a case of correcting displacements of press position and transfer position between a support frame and a forming mold among those provided more than one, a highly precise treatment of correction can be performed by moving the position of forming mold every time the displacement of position is corrected.

BRIEF DESCRIPTION OF THE DRAWINGS

FIG. 9 is a view for explaining the treatment for determining the position between a mold and a frame (part two).

MEANINGS OF SYMBOLS

Figure 1:
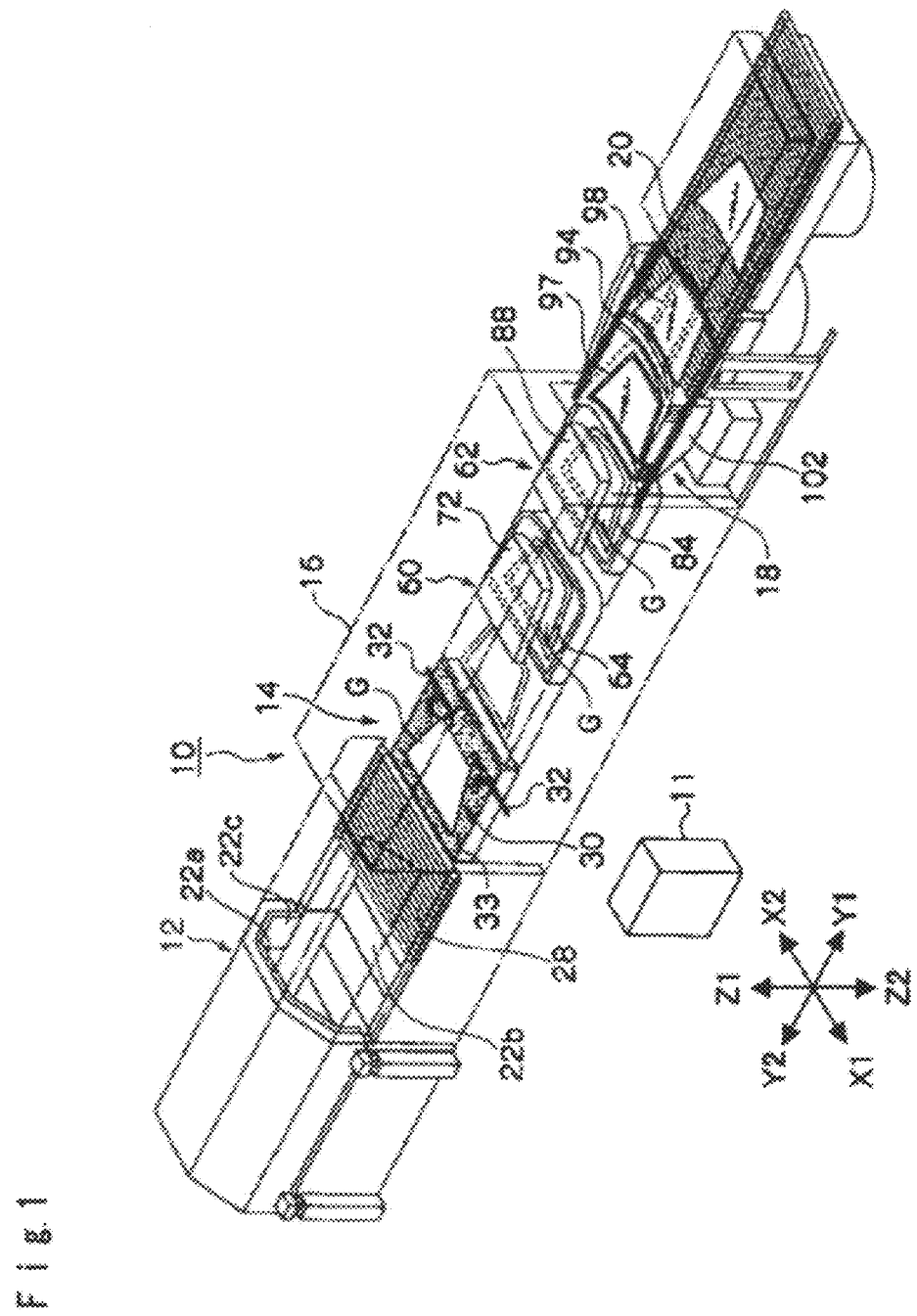
FIG. 1 is a perspective view of an embodiment of the apparatus for bending a glass sheet according to the present invention wherein the apparatus is partially in phantom.

10: Bending apparatus
11: Controller
12: Heating furnace
14: Positioning zone
16: Forming furnace
20: Roller conveyer
35: Flat mold
60: Preforming apparatus
62: Full-forming apparatus
63, 83: Elevating arm
64: Preforming support frame
66, 86: Shuttle
66c, 86c: Stage
72: Preforming mold
73, 89: Forming surface
84: Full-forming support frame
88: Full-forming mold
110, 111, 150: Detecting means
112, 113: Movable means
115 to 117: Sensor
118 to 120: Sensing plate
121 to 124: Actuator (servomotor)
127A, 127B: Connection member
125, 126: Fixed flange
130, 140: Movable plate
131, 141: Chain
132, 142: Positioning pin 135, 145, 155: Positioning socket
151 to 154: Sliding/rotating mechanism

BEST MODE FOR CARRYING OUT THE INVENTION

Then, description will be made on the best mode for carrying out the present invention with reference to the drawings.

FIG. 1 to FIG. 5 show an apparatus 10 for bending a glass sheet according to an embodiment of the present invention. The bending apparatus 10 comprises a heating furnace 12, a positioning zone 14, a forming furnace 16, an air-cooling tempering zone 18 and a roller conveyer 20 successively in this order from an upper stream side (a Y2 side) to a lower stream side (a Y1 side) along which a glass sheet G is conveyed. Operation timings and heating temperatures to these members and detecting means 110, 111, movable means 112, 113 and so on (which will be described later) are controlled altogether by a controller 11.

The heating furnace 12 is an electrically heating furnace comprising a plurality of sectioned zones (including the positioning zone 14 and the forming is furnace 16). Each section of electrically heating furnace is provided with a top heater 22a, a floor heater 22b and a side wall heater 22c. Heaters in certain zones are omitted from the drawing to simplify explanation. For the heaters in each zone of electrically heating furnace, the temperature for heating a glass sheet G is determined depending on the composition, shape, size, thickness and so on of the glass sheet G to be bent. These heaters may be gas heaters other than electric heaters.

The glass sheet G is conveyed in these sections of electric heating furnace by means of a roller conveyer 28 or the like. Then, it is heated to a predetermined bending temperature (near the softening point: e.g. 650 to 720° C.) while it is conveyed in the first half portion of these electric heating furnace and is conveyed to the positioning zone 14.

The positioning zone 14 is provided with a hearth bed 30, traveling positioners 32, 32 and a flat mold 35. The hearth bend 30 is a platen having a surface area sufficiently larger than the surface area of a plane of the glass sheet G. In the flat surface of the platen, a large number of air-jet orifices 33 are formed densely. In a lower portion of the hearth bed 30, an air inlet port (not shown) communicated with the air-jet orifices 33 is formed and this air inlet port is connected to a combustion blower (not shown) via a dumper (not shown).

Accordingly, compressed air of high-temperature compression from the combustion blower, after having been subjected to pressure regulation by the dumper, is jetted upward from the air inlet port through the air-jet orifices 33. The pressure of jetted air is determined to an extent capable of supporting the glass sheet G in an air-floating state. Accordingly, the glass sheet G conveyed to the positioning zone 14 can be supported in an air-floating state above the upper surface of the hearth bed 30.

The later half portion of the roller conveyer 28 and the conveying path on the hearth bed 30 have slight down slopes (for example, 1 to several degrees) toward the downstream (in the direction shown by an arrow mark Y1 in FIGS. 1 and 2). Therefore, due to an inertia force given by the roller conveyer 28 and the own weight of the glass sheet G, the glass sheet G moves above the hearth bed 30 at a predetermined rate toward the downstream side while it is supported in an air-floating state.

Figure 3:
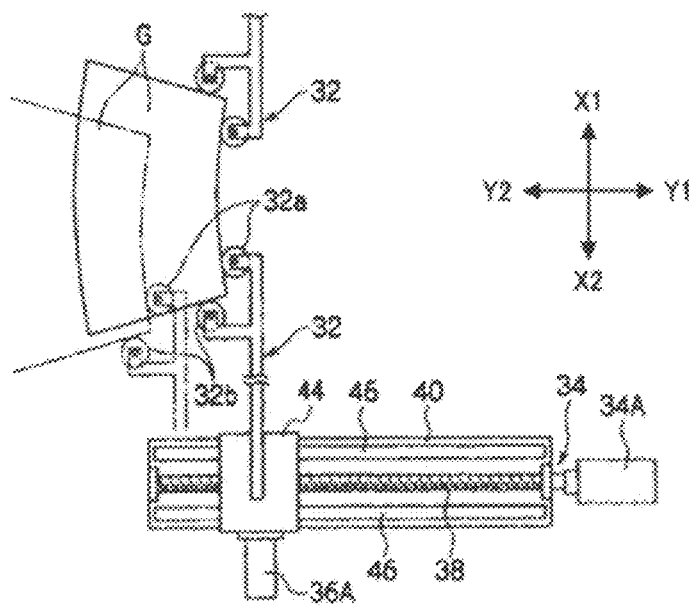
FIG. 3 is a plane view showing the structure of a position moving apparatus.

The positioners 32, 32 are provided at two positions so as to receive the corner portions of downstream side of the glass sheet G supported in an air-floating state, as shown in FIG. 3. These positioners 32, 32 are movable in a direction (a Y1 direction) to convey the glass sheet G and in directions perpendicular to the Y1 direction in a horizontal plane (hereinbelow, referred to as directions of X1 and X2).

Each end portion of the paired positioners 32, 32 has a fork-like shape as shown in FIG. 3. At two lower portions of forked portions, disks 32a, 32b which touch edges of the glass sheet G are provided so as to be rotatable. When the glass sheet G enters in the positioning zone 14, leading edges of the glass sheet touch the disks 32a, 32b.

The positioners 32, 32 move in a Y1 direction receiving the glass sheet G with the disks 32a, 32a, and at the same time, the positioners 32, 32 move slightly inwardly in a direction of X1-X2 to carry out alignment of position in a direction of X1-X2, so that the disks 32b, 32b at their end portions of the positioners are brought to contact with the corner portions of the glass sheet G and they move slightly the glass sheet G in a direction of X1-X2. Thus, the position of the glass sheet G in a direction of X1-X2 is determined.

As described above, the position of the glass sheet in the positioning zone 14 is determined in a direction of X1-X2 as well as a direction of Y1-Y2. Such positioning is carried out so that the position of the glass sheet G is aligned correctly with the position of a preforming support frame (described later) located in the forming furnace 16 in FIGS. 1 and 2. The glass sheet G whose position has been determined by the positioners 32, 32 is held by air-sucking by means of the flat mold 35, and then, it is conveyed to the just above a preforming support frame 64 provided on a shuttle 66 (described later).

Figure 4:
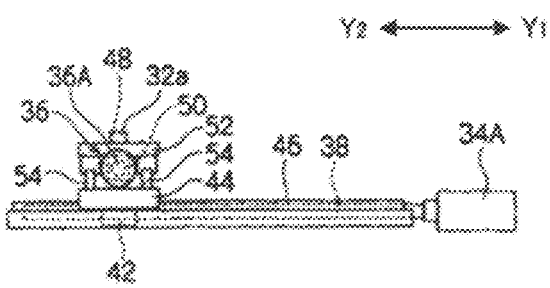
FIG. 4 is a side view showing the structure of the moving apparatus shown in FIG. 3.

A moving apparatus for the positioner 32, 32, as shown in FIGS. 3 and 4, comprises a ball screw device 34 extended in a direction of Y1-Y2 and a ball screw device 36 extended in a direction of X1-X2. A feed screw 38 in the ball screw device 34 is provided along a base 40 extended in a direction of Y1-Y2, and a nut 42 in a ball screw device 34 is provided in a lower portion of a block 44.

The block 44 is engaged with the feed screw 38 via the nut 42 and is supported by a pair of rails 46, 46 arranged along the base 40 so as to be movable in a direction of X1-X2. Accordingly, when a motor 34A in the ball screw device 34 is driven in a normal rotation or reverse rotation, the block 44 is moved in a direction of Y1-Y2.

A feed screw 48 is provided in an upper surface of the block 44 in a direction of X1-X2 as shown by a broken line in FIG. 4. A ball screw device 36 has a nut 50 provided in a lower portion of a block 52. The block 52 is engaged with the feed screw 48 via the nut 50 and is supported by a pair of rails 54, 54 disposed in an upper surface of the block 44 in a direction of X1-X2 so that it can be moved in a direction of X1-X2.

Accordingly, when a motor 36A in the ball screw device 36 is driven for normal rotation or reverse rotation, the block 52 is moved in a direction of X1-X2. Thus, when the ball screw devices 34, 36 are driven, the positioner 32 fixed to the block 52 is moved in directions of X1-X2 and Y1-Y2. Even in this positioning zone 14, electric heaters (not shown) are provided on an upper wall, side walls and floor of the furnace surrounding the hearth bed 30 in order to maintain the glass sheet G at a high temperature during the positioning.

Figure 2:
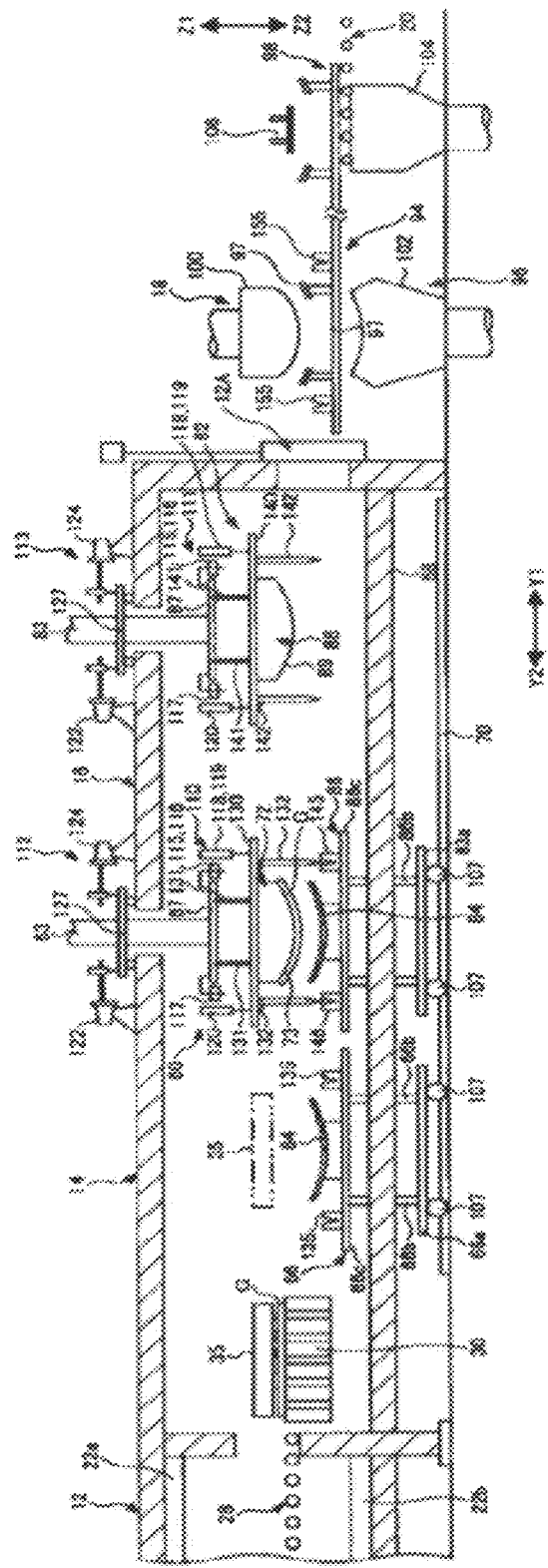
FIG. 2 is a side view showing diagrammatically the structure of the bending apparatus shown in FIG. 1.

On the other hand, the flat mold 35 shown in FIG. 2 is a platen having a surface area sufficiently larger than the surface area of a surface of the glass sheet G, and in a flat lower surface of the platen, a large number of air-jetting/sucking orifices (not shown) are formed densely. In an upper portion of the flat mold 35, an air inlet port (not shown) communicated with these air-jetting/sucking orifices is formed, and a combustion blower (not shown) and an air sucking means are connected to the air inlet port via a dumper (not shown).

The flat mold 35 is so constructed as to reciprocate between the position indicated by a solid line in FIG. 2 and a position (the position indicated by two dotted chain line in FIG. 2) which is intermediate between the above-mentioned position and the preforming apparatus 60, by means of a conveying means (not shown).

The forming furnace 16 is communicated with the positioning zone 14, and the inside of the forming furnace is under a high temperature condition suitable for bending with use of heaters (not shown) in the same manner as the positioning zone 14. At an upper stream side in the forming furnace 16, the preforming apparatus 60 (preforming means) is provided, and at a downstream side of the preforming apparatus 60, a full-forming apparatus 62 (full-forming means) is provided.

When a glass sheet G is transferred from the positioning zone 14 onto the preforming apparatus 60, the flat mold 35 is descended in a state that a glass sheet G is positioned in the positioning zone 14 and then, it holds the glass sheet G by sucking air. At this moment, the pressure of air jetted through the air-jet orifices 33 of the hearth bed 30 is higher than the pressure of air for floating the glass sheet G so as to assist the sucking action of the flat mold 35 to the glass sheet G.

Then, the glass sheet G is conveyed to an upper position of a preforming support frame 64 as a component of the preforming apparatus 60, in a state that the glass sheet G is held by the sucking action of the flat mold 35. When the glass sheet G is conveyed to the upper position of the preforming support frame 64, the sucking action by the flat mold 35 is canceled, so that the glass sheet falls onto the preforming support frame 64. The preforming support frame 64 is so formed as to have a shape corresponding to the contour of the glass sheet G whereby the peripheral edge (the edge surface or in the vicinity thereof) of the glass sheet G can be supported.

Since the preforming support frame 64 is moved toward the flat mold 35 just before the glass sheet G is placed thereon, the placement of the glass sheet G is carried out at the position shown in FIG. 2.

The preforming support frame 64 having the construction described above is disposed on the shuttle 66 made of steel. The shuttle 66 comprises a base 66a, post members 66b and a stage 66c.

The base 66a has self-propelled wheels 107 connected to a servomotor (not shown) to rotate them. The self-propelled wheels 107 are engaged with rails 70 laying on the base on which the bending apparatus 10 is installed. Accordingly, by driving the servomotor, the shuttle 66 is movable in a direction indicated by arrow marks Y1, Y2 in the Figure. The shuttle 66 is not connected to a shuttle 86 (which will be described later) and therefore, it can run independent from the shuttle 86.

A plurality of post members 66b fixed to the base 66a are extended upward through a slit (not shown) formed in the furnace floor 68. The stage 66c is disposed at upper end portions of the post members 66b extended upwardly from the furnace floor 68. On the upper surface of the stage 66c, the preforming support frame 64 and positioning sockets 135 are provided. The positional relationship between the preforming support frame 64 and the positioning sockets 135 is highly precise.

In the positioning zone 14, the shuttle 66 is moved to a position indicated by two-dotted chain line in FIG. 2, and a conveyed glass sheet G is placed on the preforming support frame 64. Then, the self-propelled wheels 107 of the shuttle 66 are driven according to an instruction from the controller 11 whereby the preforming support frame 64 holding thereon the glass sheet G is moved in a direction of arrow mark Y1 (toward the preforming apparatus 60) with the movement of the shuttle 66.

Figure 5:
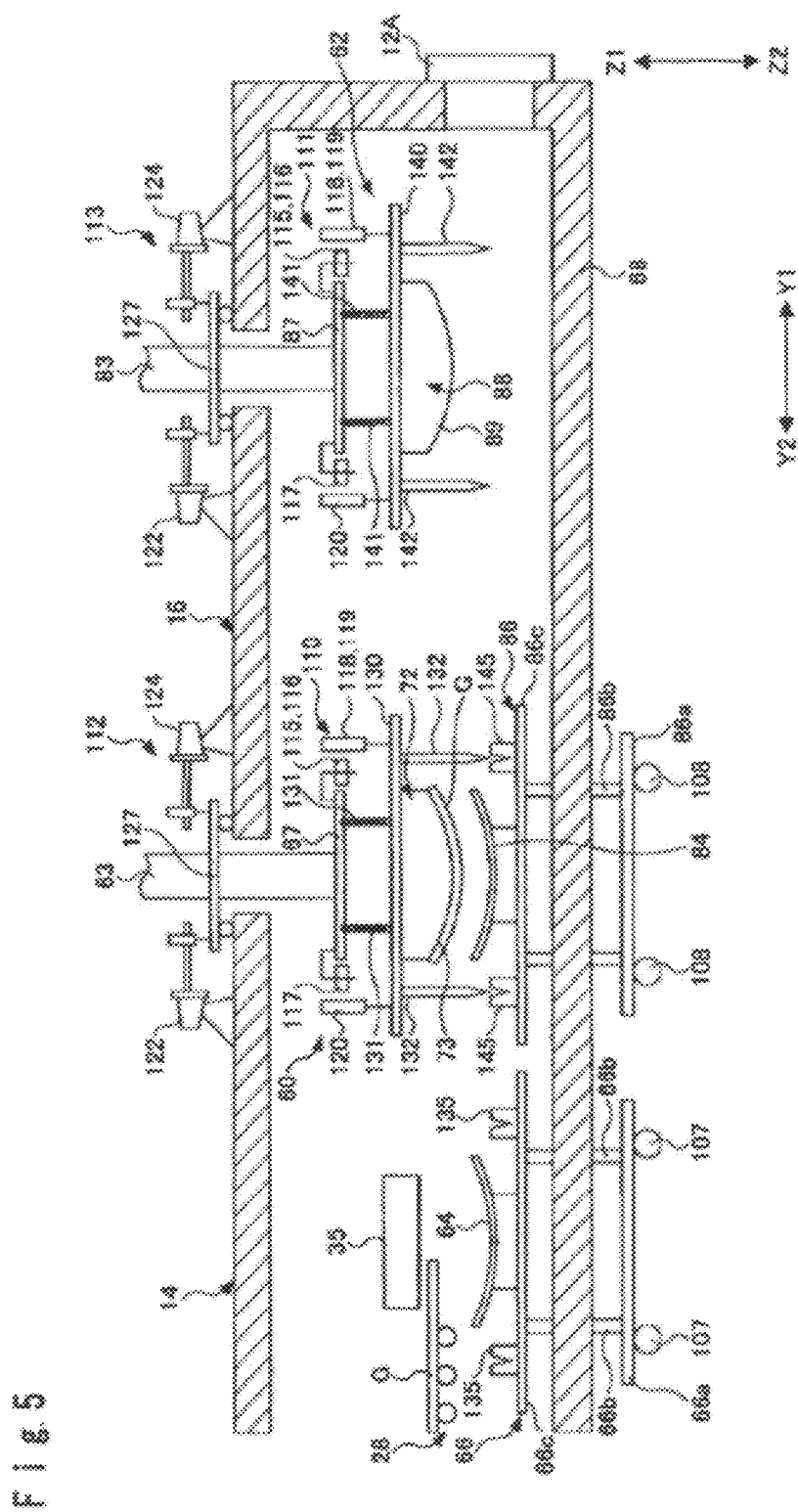
FIG. 5 is a diagram in enlarged view of essential portions of a preforming apparatus and a full-forming apparatus.

FIG. 5 shows an embodiment in which the hearth bed 30 is not employed. The flat mold 35 is located just behind the roller conveyer 28 so that a glass sheet G conveyed by the roller conveyer 28 is received directly by the flat mold 35. With jetted air and sucked air from the air-jetting/sucking orifices in the lower surface of the flat mold 35, the glass sheet G is held by the flat mold 35 without any contact thereto and is moved to a downstream side with the flat mold. In this case, since the flat mold 35 is provided with the positioners as shown in FIGS. 3 and 4, the position of the glass sheet G is determined to a predetermined position while it is moved to the downstream side. At the predetermined position, the air-sucking from the flat mold 35 is canceled so that the glass sheet is placed on the preforming support frame 64. Then, the preforming support frame moves the glass sheet G in a direction of arrow mark Y1 (toward the preforming apparatus 60) in the same manner.

The preforming support frame 64 constitutes the preforming apparatus 60 in association with a preforming mold 72. The preforming mold 72 is fixed to a movable plate 130 as shown in an enlarged view in FIG. 5. This movable plate 130 is suspended with a chain 131 from a fixed flange 67 provided at a lower end of an elevating arm 63, so that the movable plate 130 is movable with respect to the fixed flange 67.

A forming surface 73 in the preforming mold 72 is formed to have a size of plain surface corresponding to the substantially whole plain surface of the glass sheet G. The forming surface 73 has a curved shape and is provided with air orifices over the substantially entire surface. Each air orifice is communicated with a chamber in the preforming mold 72 and this chamber is connected to an air pump (not shown). Accordingly, when the air pump is driven for air-jetting or air-sucking, air can be jetted from or sucked into each air orifice.

The elevating arm 63 is adapted to ascend or descend (is movable in directions of arrow marks Z1, Z2 in the Figures) by means of an elevating means such as a hydraulic cylinder (not shown). Further, the elevating arm 63 is extended to an upper portion of the forming furnace 16 through a hole formed in a ceiling portion of the forming furnace 16.

In this case, the diameter of the hole formed in the ceiling portion of the forming furnace 16 is larger than the diameter of the elevating arm 63. Further, the elevating arm 63 is connected to a movable means 112 (it will be described later for convenience of explanation). With the movable means 112, the elevating arm 63 is movable in directions of arrow marks X1, X2 and directions of arrow marks Y1, Y2 in the Figures, and the elevating arm 63 can be rotated around its center axis.

As described before, the movable plate 130 attached with the preforming mold 72 is movable with respect to the fixed flange 67 because it is suspended by means of the chain 131. However, the movement of the movable plate 130 (i.e., the preforming mold 72) to the fixed flange 67 can be detected by a detecting means 110 (it will be described later for convenience of explanation).

The movable plate 130 is provided with a plurality of positioning pins 132. These positioning pins 132 can be engaged with positioning sockets 135 on the shuttle 66 and can also be engaged with positioning sockets 145 on a shuttle 86 on which a full-forming support frame 84 (described later) is installed, so that positions between the preforming support frame 64 and the preforming mold 72 and between the full-forming support frame 84 and the preforming mold 72 are determined.

Further, a fixing mechanism (not shown) is provided between the fixed flange 67 and the movable plate 130. This fixing mechanism fixes (locks) the movable plate 130 to the fixed flange 67 under control by the controller 11. Accordingly, when the fixing mechanism is in a lock-canceling state, the movable plate 130 becomes movable to the fixed flange 67. On the other hand, when the fixing mechanism is in a locking state, the movable plate 130 is fixed to the fixed flange 67 whereby its movement is restricted.

When the preforming support frame 64 on which the glass sheet G is placed is moved to just below the preforming mold 72 of the preforming apparatus 60, the preforming mold 72 after having undergone the correction of position by the movable means 112 (the detail will be described later), descends to press the glass sheet G on the preforming support frame 64 so that the glass sheet is bent in a predetermined shape. At this moment, air is sucked through each air orifice of the preforming mold 72 and the glass sheet G is held on the forming surface 73 of the preforming mold 72 by an air-sucking action.

Then, the glass sheet G held on the preforming mold 72 by an air-sucking action falls due to the cancellation of air from the preforming mold 72, and it is placed on the full-forming support frame 84. The full-forming support frame 84 is formed to have a shape corresponding to the contour of the glass sheet G so as to support a peripheral portion (an edge surface or the vicinity thereof) of the glass sheet G at the time of full-forming. In this case, the full-forming support frame 84 is moved toward the preforming mold 72 just before the placement of the glass sheet G. Accordingly, the placement of the glass sheet G is carried out at a position shown in FIG. 2.

Then, the self-propelled wheels 108 provided in the shuttle 86 are driven according to an instruction of the controller 11 whereby the full-forming support frame 84 holding thereon the glass sheet G moves in a direction of arrow mark Y1 (toward the full-forming apparatus 62) in the Figure with the movement of the shuttle 86.

In this case, each forming surface 65 or 73 of preforming support frame 64 or preforming mold 72 is formed to be shallower than each forming surface 85 or 89 in the full-forming apparatus 62, which will be described later. Namely, it is preferable that the deformation volume of a glass sheet G undergone preforming is from 20 to 80% (most preferably, from 20 to 50%) of the deformation volume that a flat glass sheet has been deformed to a final shape. Such values can preferably be determined by using a cross-curvature of a glass sheet G as a parameter.

The cross-curvature should be determined based on a radius of curvature in an in-plane portion of a glass sheet where the degree of deformation is largest (a portion where the tensile force produced at the time of bending is largest, for example). Or, it may be determined based on a mean value of radii of curvature at plural points. In either case, the preforming should be carried out in a range of from 20 to 80% of the final radius of curvature.

By conducting such preforming prior to the full-forming, an unreasonable stress does not produce in a glass sheet G at the time of full-forming, and it is possible to prevent a problem of production of wrinkles or an optical distortion in the glass sheet.

Description will be made as to the full-forming apparatus 62 comprising the full-forming support frame 84 and the full-forming mold 88. The full-forming apparatus 62 has basically the same structure as the preforming apparatus 60 except for the shape of the forming surface 89.

The full-forming support frame 84 of the full-forming apparatus 62 is formed to have a shape corresponding to the glass sheet G bent in the preforming apparatus 60. The full-forming support frame 84 is installed on the shuttle 86 comprising a base 86a, post members 86b and a stage 86c. The base 86a is provided with self-propelled wheels 108 connected to a servomotor (not shown) rotate them. The self-propelled wheels 108 are also engaged with the rails 70, and by driving the servomotor, the shuttle 86 is moved in directions of arrow marks Y1 and Y2 (a direction to convey the glass sheet G) in the Figure.

As described before, the shuttle 86 is not connected to the shuttle 66, and it can run independent from the shuttle 66. Further, the servomotor provided in the shuttle 86 is also connected to the controller 11 so that the movement is controlled by the controller 11.

The post members 86b on the base 86a are extended upward through a slit (not shown) formed in the furnace floor 68. The stage 86c is disposed at upper end portions of the post members 86b extended upward from the furnace floor 68. On an upper surface of the stage 86, the full-forming support frame 84 and positioning sockets 145 are provided. The positional relationship between the full-forming support frame 84 and the positioning sockets 145 is determined with high precision.

A glass sheet G is transferred from the preforming apparatus 60 onto the full-forming support frame 84. Then, the self-propelled wheels 108 of the shuttle 86 are driven according to an instruction from the controller 11 so that the full-forming support frame 84 holding thereon the glass sheet G moves to the position just below the full-forming mold 88 with the movement of the shuttle 86.

The full-forming mold 88 constituting the full-forming apparatus 62 in association with the full-forming support frame 84 is fixed to a movable plate 140. A forming surface 89 in the full-forming mold 88 is formed to have a size of plain surface corresponding to the substantially whole plain surface of the glass sheet G and the radius of curvature in the plain surface is larger than that of the preforming mold 72.

The movable plate 140 is suspended with a chain 141 from a fixed flange 87 provided at a lower end of an elevating arm 83, so that the movable plate 140 is movable with respect to the fixed flange 87.

The forming surface 89 of the full-forming mold 88 is provided with air orifices over its substantially entire surface. Each air orifice is communicated with a chamber in the full-forming mold 88 and this chamber is connected to an air pump (not shown). Accordingly, when the air pump is driven for air-jetting or air-sucking, air can be jetted from or sucked into each air orifice.

On the other hand, the elevating arm 83 is adapted to ascend or descend by means of an elevating means such as a hydraulic cylinder (not shown) so that it is movable in directions of arrow marks Z1, Z2 in the Figure. Further, the elevating arm 83 is extended to an upper portion of the forming furnace 16 through a hole formed in a ceiling portion of the forming furnace 16.

In this case, the diameter of the hole formed in the ceiling portion of the forming furnace 16 is larger than the diameter of the elevating arms 83. The elevating arm 83 is connected to a movable means 113 (it will be described later for convenience of explanation). With the movable means 113, the elevating arms 83 is movable in directions of arrow marks X1, X2 and directions of arrow marks Y1, Y2 in the Figures, and also, the elevating arm 83 can be rotated around its center axis.

As described before, the movable plate 140 attached with the full-forming mold 88 is movable with respect to the fixed flange 87 because it is suspended by means of the chain 141.

The movement of the movable plate 140 (i.e., the full-forming mold 88) to the fixed flange 87 can be detected by a detecting means 111 (it will be described later for convenience of explanation).

The movable plate 140 is provided with a plurality of positioning pins 142. These positioning pins 142 can be engaged with positioning sockets 145 on a shuttle 86 so that the position between the support frame 84 and the full-forming mold 88 is determined.

Further, a fixing mechanism (not shown) is provided between the fixed flange 87 and the movable plate 140. This fixing mechanism fulfills its function of fixing (locking) the movable plate 140 to the fixed flange 87 under control by the controller 11. Accordingly, when the fixing mechanism is in a lock-canceling state, the movable plate 140 becomes movable to the fixed flange 87. On the other hand, when the fixing mechanism is in a locking state, the movable plate 140 is fixed to the fixed flange 87 whereby its movement is restricted.

When the full-forming support frame 84 on which the glass sheet G is placed is moved to just below the full-forming mold 88 of the full-forming apparatus 62, the full-forming mold 88, after having undergone the correction of position by the movable means 113 (the detail will be described later), descends to press the glass sheet G on the full-forming support frame 84 so that the glass sheet is bent in a final shape. At this moment, air is sucked through each air orifice of the full-forming mold 88 so that the glass sheet G is held on the forming surface 89 of the full-forming mold 88 by an air-sucking action.

Then, the glass sheet G held on the full-forming mold 88 by an air-sucking action falls onto a quench ring 97 due to the cancellation of air-sucking of the full-forming mold 88. This quench ring 97 is formed to have a shape corresponding to the contour of the glass sheet G so as to support a peripheral portion (an end surface or a vicinity thereof) of the glass sheet G bent in a final shape. In this case, since the quench ring 97 is moved toward the full-forming mold 88 just before the glass sheet G is placed, the placement of the glass sheet G is carried out at the position just below the full-forming mold 88.

Then, the quench ring 97 holding thereon the glass sheet G moves in a direction of arrow mark Y1 (toward an air-cooling tempering apparatus 96) in the Figure with the movement of a quench shuttle 94.

Figure 6:
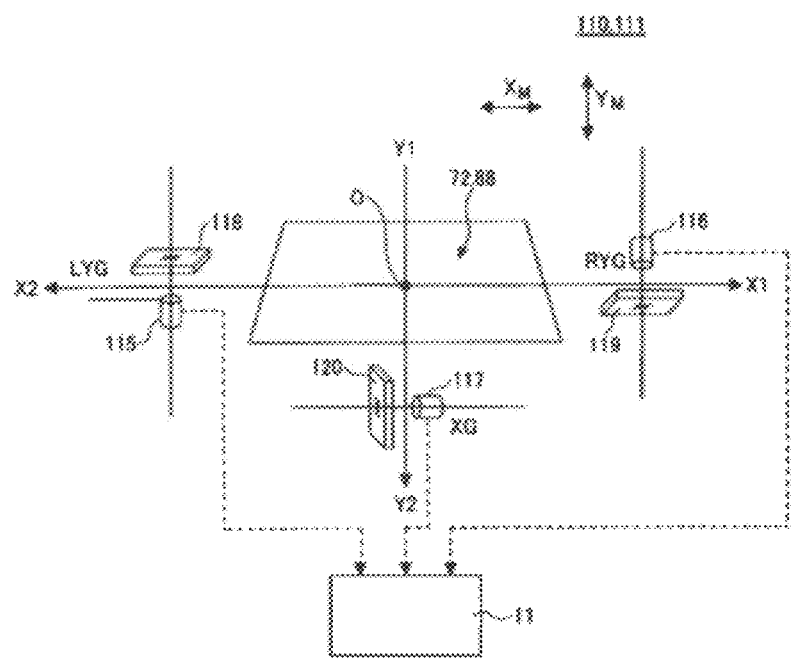
FIG. 6 is a view for explaining detecting means provided at the preforming apparatus and the full-forming apparatus.

Now, description will be made as to detecting means 110, 111 provided in the preforming apparatus 60 and the full-forming apparatus 62 each having the structure as described above, with respect to FIGS. 5 and 6. Since the detecting means 110 provided in the preforming apparatus 60 has the same structure as the detecting means 111 provided in the full-forming apparatus 62, they are explained in a lump.

The detecting means 110 (111) functions as a forming position detecting means for detecting a displacement of press position between the shuttle 66 (86) (i.e., a forming support frame) and the forming mold 72 (88) at the time of pressing a glass sheet G against the forming mold 72 (88). Further, the detecting means 110 (111) also functions as a transfer position detecting means for detecting a displacement of transfer position of the glass sheet G with respect to the forming mold 72 (88) and the shuttle 86 or the quench shuttle 94 at the time of transferring the glass sheet G having a predetermined curved shape onto the shuttle 86 or the quench shuttle 94 (i.e. quench ring 97). Hereinbelow, description will be made in detail as to the forming position detecting means and the transfer position detecting means.

In the preforming step, the preforming support frame 64 fulfills its function of preforming the glass sheet G in association with a pressing force of the preforming mold 72. Further, in this embodiment, the preforming support frame 64 functions as a conveyance support frame for supporting the glass sheet G in a conveyance step wherein the preforming support frame receives the glass sheet G from the flat mold 35 and then it conveys the glass sheet to a position just below the preforming mold 72.

Similarly, in the full-forming step, the full-forming support frame 84 fulfills its function of full-forming the glass sheet G in association with a pressing force of the full-forming mold 88. Further, in this embodiment, the full-forming support frame 84 functions as a conveyance support frame for supporting the glass sheet G in a conveyance step wherein the full-forming support frame receives the glass sheet of provisionally curved shape from the preforming mold 72 and then it conveys the glass sheet G to a position just below the full-forming mold 88.

Accordingly, in the conveyance step, it performs as a conveyance support frame and in the next step, it performs as a forming support frame, and the forming step and the conveyance step are conducted successively several times (two times in this embodiment). Thus, each support frame realizes repeatedly its functions as a conveyance support frame and a forming support frame.

The glass sheet G which has undergone to be in a finally curved shape is removed from the full-forming mold 88 and it is cooled with air from a lower blowing head 102. In this case, the movement of the glass sheet G from the full-forming mold 88 to the lower blowing head 102 is carried out by means of the quench ring 97 (the detail will be described later). The quench ring 97, after having received the glass sheet G of finally curved shape formed by the full-forming mold 88, functions as a conveyance support frame for conveying the glass sheet to a position at which it is cooled with the lower blowing head 102 and an upper blowing head 100.

Accordingly, the detecting means 110 provided in the preforming apparatus 60 serves as a preforming position detecting means for detecting a displacement of press position with respect to the preforming support frame 64 and the preforming mold 72 at the time of pressing the glass sheet G against the preforming mold 72. In this case, the press position with respect to the preforming support frame 64 and the preforming mold 72, which has been memorized in the memory means of the controller 11, is renewed with a newly detected displacement of press position. Further, the detecting means 110 also serves as a first transfer position detecting means for detecting a displacement of transfer position of the glass sheet G with respect to the preforming mold 72 and the full-forming support frame 84 at the time of transferring the glass sheet G of provisionally curved shape onto the shuttle 86. In this case, the transfer position of the glass sheet G with respect to the preforming mold 72 and the full-forming support frame 84, which has been memorized in the memory means of the controller 11, is renewed with a newly detected displacement of transfer position.

The detecting means 111 provided in the full-forming apparatus 62 serves as a full-forming position detecting means for detecting a displacement of press position between the full-forming support frame 84 and the full-forming mold 88 at the time of pressing the glass sheet G of provisionally curved shape against the full-forming mold 88. In this case, the press position between the full-forming support frame 84 and the full-forming mold 88, which has been memorized in the memory means of the controller 11, is renewed with a newly detected displacement of press position. Further, the detecting means 111 also serves as a second transfer position detecting means for detecting a displacement of transfer position of the glass sheet G with respect to the full-forming mold 88 and the quench ring 97 at the time of transferring the glass sheet G of finally curved shape formed in the full-forming step onto the quench ring 97. In this case, the transfer position of the glass sheet G with respect to the full-forming mold 88 and the quench ring 97, which is memorized in the memory means of the controller 11, is renewed with a newly detected displacement of transfer position. Here, the finally curved shape means a shape formed in the full-forming step and therefore, the glass sheet G may further be bent due to its own weight or deformed by cooling on the quench ring 97.

The detecting means 110 or 111 comprises sensors 115 to 117 and sensing plates 118 to 120. The sensors 115 to 117 are contactless distance sensors and are fixed to the fixed flange 87. The sensing plates 118 to 120 are disposed to oppose the sensors 115 to 117.

The sensors 115 to 117 are eddy current displacement sensors which measure distances to the sensing plates 118 to 120 without any contact. Signals produced in these sensors 115 to 117 are sent to the controller 11 (control means), and the controller 11 calculates distances between the sensors 115 to 117 and the sensing plates 118 to 120 based on these signals.

As described before, when each fixing mechanism is in a lock-canceling state, the movable plate 130 or 140 is movable with respect to the fixed flange 67 or 87. Accordingly, with such detecting means 110 or 111, the position of the movable plate 130 or 140 to the fixed flange 67 or 87 can be detected.

Now, it is assumed that, of the movement of the movable plate 130 (i.e. the preforming mold 72) or the movable plate 140 (i.e. full-forming mold 88), a travel distance in a direction X1 or X2 is expressed by $X_M$ (hereinbelow, referred to as the X-direction travel distance $X_M$), a travel distance in a direction Y1 or Y2 is expressed by $Y_M$ (hereinbelow, referred to as the Y-direction travel distance $Y_M$) and a rotation angle around the center axis O is expressed by θ (hereinbelow, referred to as the rotation angle θ). Further, a travel distance obtained by an output from a censor 115 is expressed by LYG, a travel distance obtained by an output from a sensor 116 is RYG and a travel distance obtained by an output from a sensor 117 is XG.

Further, the position of the movable plate 130 or 140 in a state that the positioning pins 132 or 142 are separate from the positioning sockets 135 or 145, namely, the position of the movable plate 130 or 140 being suspended vertically from the fixed flange 68 or 87 without any external force, is assumed to be the initial position. Then, when the movable plate 130 or 140 is in the initial position, $X_M$=0, $Y_M$=0 and θ=0.

In the structure described above, when the movable plate 130 or 140 moves from the initial position, the X-direction travel distance $X_M$, the Y-direction travel distance $Y_M$ and the rotation angle θ can be obtained as follows.

The rotation angle θ can be calculated from a difference between a travel distance LYG obtained by an output from a sensor 115 and a travel distance RYG obtained by an output from a sensor 116. The X-direction travel distance $X_M$ can be calculated by subtracting a distance component in X-direction after a rotation with a rotation angle θ, from a travel distance XG obtained by an output from a sensor 115. Further, the Y-direction travel distance $Y_M$ can be calculated by subtracting a distance component in Y-direction after a rotation with a rotation angle θ, from a travel distance LYG obtained by an output from a sensor 115.

As described above, the travel distance of the movable plate 130 or 140 (i.e. the forming mold 72 or 88) to the fixed flange 67 or 87 is calculated in the controller 11 on the basis of an output from the detecting means 110 or 111. A result of calculation is stored in the memory device (memory means) in the controller 11.

Figure 7:
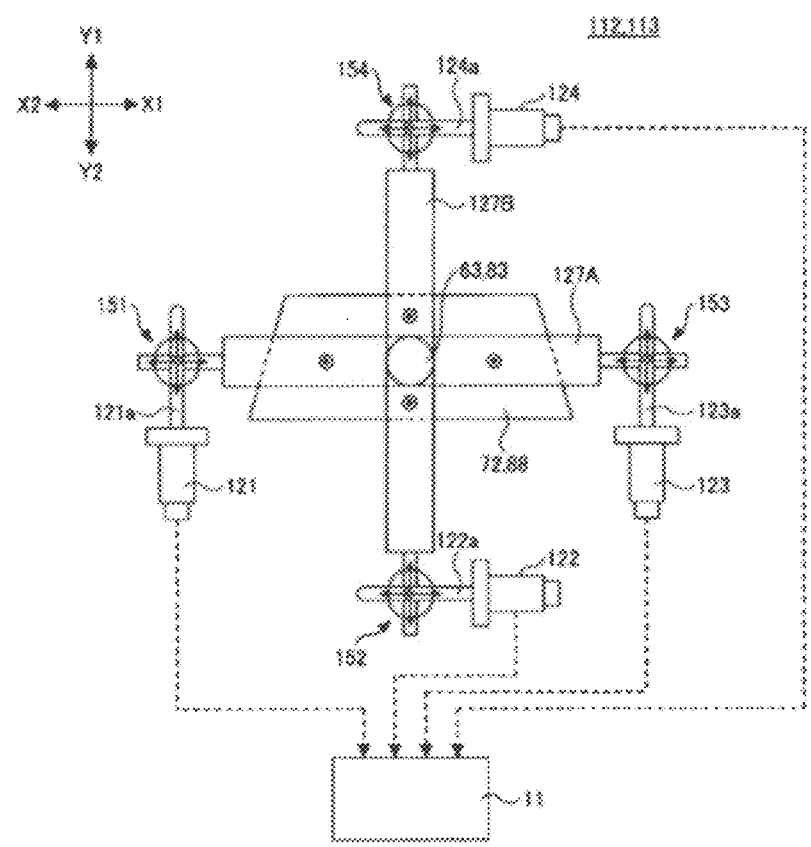
FIG. 7 is a view for explaining movable means provided at the preforming apparatus and the full-forming apparatus.

In the following, description will be made as to the movable means 112 and 113 provided on the preforming apparatus 60 and the full-forming apparatus 62 respectively, with reference mainly to FIG. 7. Since the movable means 112 provided on the preforming apparatus 60 has the same structure as the movable means 113 provided on the full-forming apparatus 62, the movable means 112, 113 are explained in a lump.

The movable means 112 (113) comprises four actuators 121 to 124 and a pair of connection members 127A, 127B intersecting crosswise in this embodiment. Driving shafts 121a to 124a of actuators 121 to 124 are provided at their respective end portions with sliding/rotating mechanisms 151 to 154 formed in combination of LM guides and bearings so as to be capable of sliding and rotating. These sliding/rotating mechanisms 151 to 154 are connected to edges of the connection members 127A, 127B so that they can slide in two directions: directions of arrow marks X1, X2 and directions of arrow marks Y1, Y2, and they can rotate at these edges.

The connection member 127A is disposed between the sliding/rotating mechanism 151 and the sliding/rotating mechanism 153 and the connection member 127B is disposed between the sliding/rotating mechanism 152 and the sliding/rotating mechanism 154 so that the paired connection members 127A, 127B are fixed crosswise. However, the connection members 127A, 127B may not necessarily be crossed but they may be comprised of four members fixed at four positions with respect to the elevating arm 63 or 83.

Figure 12:
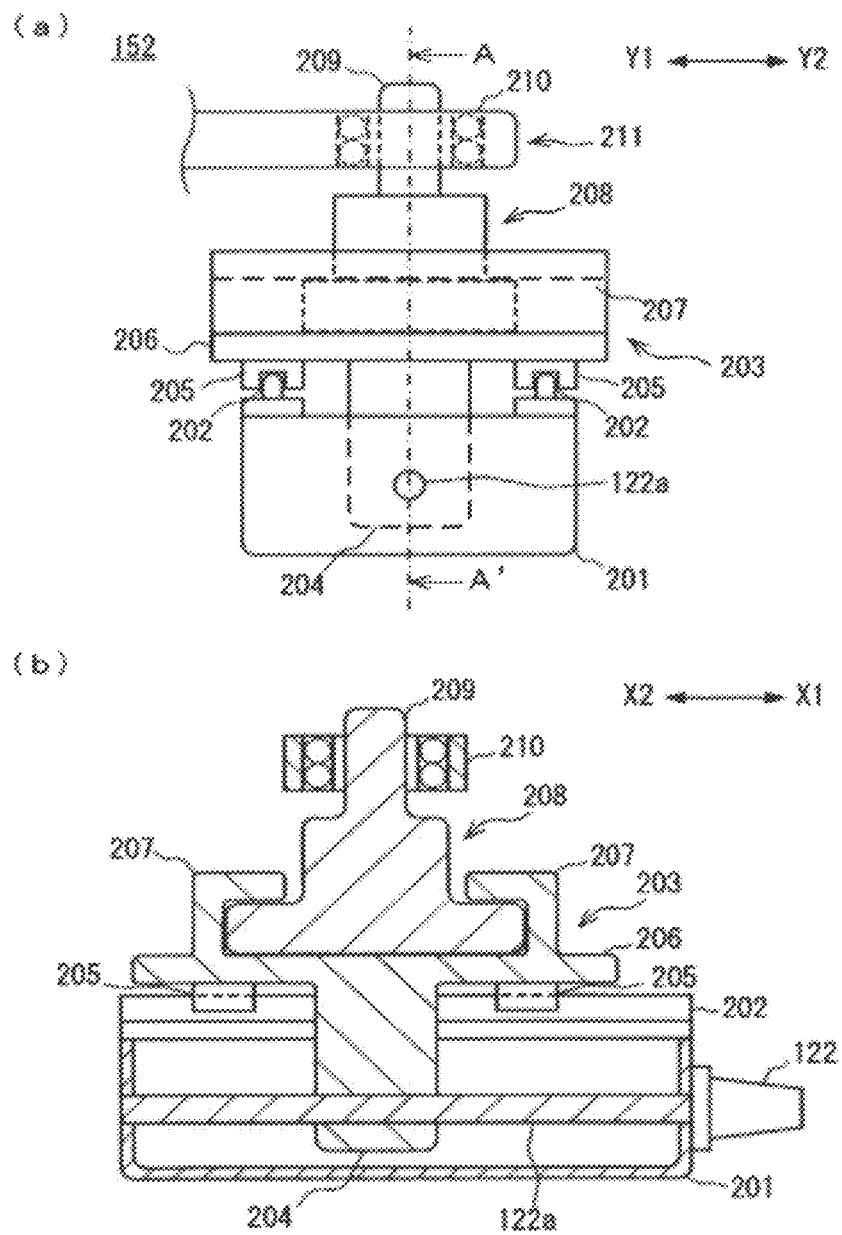
FIG. 12 is a view for explaining a sliding/rotating mechanism of movable means provided in the preforming apparatus or the full-forming apparatus.

The sliding/rotating mechanisms 151 to 154 are explained in detail with reference to FIG. 12. FIG. 12 shows only an actuator 122 and a sliding/rotating mechanism 152. However, since the structure of the sliding/rotating mechanisms 151 to 154 are the same, description on the other sliding/rotating mechanisms 151, 153 and 154 is omitted. FIG. 12(a) is a front view of the sliding/rotating mechanism 152 when it is viewed from a side of X2 to a side of X1, and FIG. 12(b) is a cross-sectional view taken along A-A' in FIG. 12(a).

In FIG. 12, the actuator 122 is a servomotor and the driving shaft 122a is comprised of a ball screw. The sliding/rotating mechanism 152 comprises a base frame 201, a guide block 203, a metal block 208 and a metallic bearing 210. The base frame 201 is provided on an upper surface of the furnace. In the base frame 201, a ball screw 122a is provided so as to penetrate the inside of the base frame, and an end of the ball screw 122a is connected to the servomotor 122 which is fixed to a side surface of the base frame 201. On an upper surface of the base frame 201, two LM rails 202 are provided in directions X1, X2.

The guide block 203 is provided with a movable nut 204 connected to the ball screw 122a, LM blocks 205 engaged with the LM rails 202 and a table 206 attached integrally with the movable nut 204 and the LM blocks 205, so that the guide block is connected to the base frame 201 so as to be guide linearly in directions X1, X2. Accordingly, when the servomotor 122 is actuated, the guide block 203 can be moved in directions X1, X2.

Further, the guide block 203 has rectangular metal guides 207 which extend from an upper surface of the table 206 symmetrically along directions Y1, Y2. The inner portions of the metal guides 207 engage with the metal block 208 so as to guide it in directions Y1, Y2. Since the metal block 208 has no driving mechanism, the metal block 208 slides in directions Y1, Y2 depending on circumstances.

A cylindrical shaft 209 extends from an upper end portion of the metal block 208, and the shaft 209 is connected with an end portion 211 of the connection member 127B via a metallic bearing 210 so that the connection member 127B is rotatable around the bearing 209 as the center. Since the bearing 209 has no driving mechanism, the connection member 127B rotates depending on circumstances.

With such construction, the sliding/rotating mechanism 152 can move the end portion of the connection member 127B in directions X1, X2 by the actuation of the servomotor 122. Further, it is possible to slide the end portion 211 of the connection member 127B in a direction to release a force acting on the connection member 127B under conditions that other servomotors are driven. It is possible to slide the end portion of the connection portion 127B in directions Y1, Y2 depending on circumstances, and further, it is possible to rotate the connection member 127B around the center axis of the bearing 207 depending on circumstances.

This embodiment shows an example that the guide block and the metal block are arranged upward from the base frame. However, the base frame may be disposed apart from the furnace top so that the guide block and the metal block extend downward.

Accordingly, in a state that the servomotors 122, 124 are not active, when the servomotors 121, 123 move the end portions of the connection member 127A connected with these servomotors in a direction of arrow mark Y1 or Y2, the elevating arm 63 (83) is also moved in a direction of arrow mark Y1 or Y2. Further, when the servomotors 121, 123 are inactive and the servomotors 122, 124 are rendered to be active so that the end portions of the connection member 127B connected with these servomotors are moved in a direction of arrow mark X1 or X2 in the Figure, the elevating arm 63 (83) is also moved in a direction of arrow mark X1 or X2.

When the servomotor 121 moves the end portion of the connection member 127A in a direction of arrow mark Y1, the servomotor 122 moves the end portion of the connection member 127B in a direction of arrow mark X2, the servomotor 123 moves the other end portion of the connection member 127A in a direction of arrow mark Y2 and the servomotor 124 moves the other end portion of the connection member 127B in a direction of arrow mark X1, the end portion at a side of servomotor 121 of the connection member 127A slides in a direction of the arrow mark X1 and rotates clockwise depending on circumstances, the end portion at a side of servomotor 122 of the connection member 127B slides in a direction of Y1 and rotates clockwise depending on circumstances, the end portion at a side of servomotor 123 of the connection member 127A slides in a direction of X2 and rotates clockwise depending on circumstances, and the end portion at a side of servomotor 124 of the connection member 127B slides in a direction of Y2 and rotates clockwise depending on circumstances, whereby the elevating arm 63 (83) rotates clockwise.

Further, when the servomotor 121 moves the end portion of the connection member 127A in a direction of arrow mark Y2, the servomotor 122 moves the end portion of the connection member 127B in a direction of arrow mark X1, the servomotor 123 moves the other end portion of the connection member 127A in a direction of arrow mark Y1 and the servomotor 124 moves the other end portion of the connection member 127B in a direction of arrow mark X2, the end portion at a side of servomotor 121 of the connection member 127A slides in a direction of the arrow mark X1 and rotates counterclockwise depending on circumstances, the end portion at a side of servomotor 122 of the connection member 127B slides in a direction of Y1 and rotates counterclockwise depending on circumstances, the end portion at a side of servomotor 123 of the connection member 127A slides in a direction of X2 and rotates counterclockwise depending on circumstances, and the end portion at a side of servomotor 124 of the connection member 127B slides in a direction of Y2 and rotates counterclockwise depending on circumstances, whereby the elevating arm 63 (83) rotates counterclockwise.

As described before, the elevating arm 63 is attached with the preforming mold 72 at its lower portion and the elevating arm 83 is attached with the full-forming mold 83 at its lower portion. Accordingly, when the elevating arms 63 or 83 is moved by the movable means 112 or 113 in a state that the movable plate 130 or 140 is fixed to the fixed flange 67 or 87 by means of the fixing mechanism, the preforming mold 72 or the full-forming mold 88 can be moved.

The actuators 121 to 124 having the above-mentioned structure can be actuated under control by the controller 11. Accordingly, it is possible to move the forming mold 72 or 88 by means of the movable means 112 or 113 on the basis of a travel distance of the movable plate 130 or 140 with respect to the fixed flange 67 or 87, the travel distance being detected by the detecting means 110 or 111.

In the next, description will be made as to a bending process to a glass sheet G in the bending apparatus 10 having the above-mentioned structure, with reference mainly to FIGS. 5, 8 and 9.

FIG. 5 shows a state that a glass sheet G is about to transfer from the roller conveyer 28 onto the flat mold 35 and the shuttle 66 has been moved to just below the flat mold 35. Then, the glass sheet G is positioned on the flat mold 35 and is placed on the preforming support frame 64 mounted on the shuttle 66. As shown in FIG. 9, the glass sheet G is moved with this shuttle 66 to a position just below the preforming mold 72.

While the shuttle 66 moves to a position just below the preforming mold 72, the controller 11 drives the movable means 112 based on the previously obtained displacement of position $R_{64-72}$ and travel distance $S_{64-72}$ (these will be described later) between the preforming mold 72 and the preforming support frame 64, which have been obtained in the previous positioning treatment and stored in the memory device, so that the elevating arm 63 is moved (is moved in a direction X1 or X2 and in a direction Y1 or Y2, or is rotated) so as to cancel the previous displacement of position $R_{64-72}$ (a preforming position correcting step). With such movement of the elevating arm 63, the preforming mold 72 is also moved. For this, the positioning pins 132 and the positioning sockets 135 are rendered to be in a state of being positioned previously with high precision.

Then, by actuating an elevating mechanism (not shown), the elevating arm 63 is descended downward (in a direction Z2). In this case, the fixing mechanism is in a lock-canceling state and accordingly, the movable plate 130 and the positioning pins attached thereto are movable with respect to the fixed flange 67.

With the descent of the elevating arm 63, the positioning pins 132 descend too so that they fit into the positioning sockets 135. The preforming support frame 64 and the positioning sockets 135 are positioned with high precision on the stage 66c, and the preforming mold 72 and the positioning pins 132 are positioned with high precision on the movable plate 130. Accordingly, by fitting the positioning pins 132 into the positioning sockets 135, it is possible to conduct the positioning between the preforming support frame 64 and the preforming mold 72 with high precision.

Further, as described above, since the elevating arm 63 is moved to a position at which the previously obtained displacement of position $R_{72-84}$ can be canceled, prior to the initiation of descending movement of the elevating arm 63, it is possible to prevent a strong contact of the positioning pins 132 against the positioning sockets 135, or the abrasion of these members at the time of fitting the pins 132 into the sockets 135 with the descending movement of the elevating arm 63.

However, the preforming apparatus 60 and the shuttle 66 are structures including movable elements and accordingly, it is difficult for them to operate always at a predetermined position and they might have errors due to temporal change. Accordingly, even when a positional displacement correcting treatment is carried out prior to the initiation of descending movement of elevating arm 63, there is still a possibility of occurrence of a displacement of position between the preforming mold 72 and the preforming support frame 64.

If such a displacement of position takes place, the movable plate 130 is adapted to move with respect to the fixed flange 67 at the time of fitting the positioning pins 132 into the positioning sockets 135. A travel distance of the movable plate 130 to the fixed flange 67 can be detected by the detecting means 110. The detecting means 110 sends to the controller 11a detection signal corresponding to a displacement of position between the preforming mold 72 and the preforming support frame 64. In the controller 11, the displacement of position $R_{64-72}$ (an X-directional travel distance $X_{M64-72}$, a Y-directional travel distance $Y_{M64-72}$ and a rotation angle $\theta_{64-72}$) between the preforming mold 72 and the preforming support frame 64 is calculated based on this detection signal.

Then, the controller 11 drives the movable means 112 based on the displacement of position $R_{64-72}$ to move the elevating arm 62 in a direction to cancel the displacement of position (in this case, the travel distance of the elevating arm 63 is expressed by $S_{64-72}$) In this case, the elevating arm 63 may be moved in a lump based on the above-mentioned displacement of position $R_{64-72}$ or may be moved sequentially, or may be moved under real-time control such as feedback control, based on detection signals from the detecting means 110.

Thus, the positioning of the elevating arm 63 to the movable plate 130 is carried out. In this state, the fixing mechanism locks (fixes) the movable plate 130 to the fixed flange 67. The displacement of position $R_{64-72}$ between the preforming apparatus 60 and the shuttle 66 and the travel distance $S_{64-72}$ indicating the movement of the elevating arm 63 based on the previous displacement of position, obtained in a manner as described above, are stored in the memory device in the controller 11. However, when the previous displacement of position $R_{64-72}$ and travel distance $S_{64-72}$ have already been stored, these data are renewed with newly obtained displacement of position $R_{64-72}$ and travel distance $S_{64-72}$, namely, a learning-based treatment is carried out.

The displacement of position $R_{64-72}$ and travel distance $S_{64-72}$, thus learned, are used for positioning between the preforming support frame 64 and the preforming mold 72 at the next preforming step to a glass sheet G. Since the displacement of position $R_{64-72}$ and travel distance $S_{64-72}$ learned for correcting the positions as described above, always reflect the present condition of the bending apparatus 10, the correction of the displacement of position can be carried out with high precision.

This learning-based treatment is not always limited to a renewing treatment but may be so constructed as to store mean values between the values obtained in the previous time and values obtained in the present time, or as to accumulate displacements of position $R_{64-72}$ and travel distances $S_{64-72}$ in N times of detection and to store mean values thereof.

As described above, by fitting the positioning pins 132 into the positioning sockets 135, the preforming mold 72 and the preforming support frame 64 can be positioned with high precision. Then, the elevating arm 63 is further descended to perform preforming (pressing) to a glass sheet G with the preforming mold 72. In this case, since the preforming support frame 64 and the preforming mold 72 are positioned with high precision as described above, the glass sheet G can be subjected to a previous bending process with high precision. Then, the preforming mold 72 is ascended holding the glass sheet G thereon by air-sucking.

After the preforming treatment to the glass sheet G has finished in the preforming apparatus 60, the shuttle 86 is moved to a position just below the preforming mold 72 as shown in FIG. 5. In this state, the glass sheet G is still sucked to the preforming mold 72.

While the shuttle 86 moves to a position just below the preforming mold 72, the controller 11 drives the movable means 112 based on the previously obtained displacement of transfer position $R_{72-84}$ of the glass sheet G with respect to the full-forming mold 72 and the preforming support frame 84 and travel distance $S_{72-84}$ (these will be described later), which have been obtained in the previous positioning treatment and stored in the memory device, so that the elevating arm 63 is moved (is moved in a direction X1 or X2 and a direction Y1 or Y2, or is rotated) to a position that the previous displacement of position $R_{72-84}$ is canceled (i.e., a first transfer position correcting step). With such movement of the elevating arm 63, the preforming mold 72 is also moved. For this, the positioning pins 132 and the positioning sockets 145 are rendered to be in a state of being positioned previously with high precision.

When such positional displacement canceling treatment is finished, an elevating mechanism (not shown) descends the elevating arm 64 downward (in a direction Z2). In this case, since the fixing mechanism is in a lock-canceling state, the movable plate 130 and the positioning pins 132 attached thereto become movable with respect to the fixed flange 67.

With the descent of the elevating arm 63, the positioning pins 132 descend too so that they fit into the positioning sockets 145. The full-forming support frame 84 and the positioning sockets 145 are positioned with high precision on the stage 86c, and the preforming mold 72 and the positioning pins 132 are positioned with high precision on the movable plate 130. Accordingly, by fitting the positioning pins 132 into the positioning sockets 145, it is possible to conduct the positioning between the full-forming support frame 84 and the preforming mold 72 with high precision.

Further, as described above, since the elevating arm 63 is moved to a position at which the previously obtained displacement of position $R_{72-84}$ can be canceled, prior to the initiation of descending movement of the elevating arm 63, it is possible to prevent a strong contact of the positioning pins 132 against the positioning sockets 145, or the abrasion of these members at the time of fitting the pins 132 into the sockets 145 with the descending movement of the elevating arm 63.

In a relation between the preforming apparatus 60 and the shuttle 86, errors due to temporal change or the like may take place as well as the relation between the preforming apparatus 60 and the shuttle 66 as described before. Accordingly, even though a positional displacement correcting treatment is carried out prior to the initiation of the descending movement of the elevating arm 63, there is a possibility of occurrence of a displacement of position between the preforming mold 72 and the full-forming support arm 84.

For this, when the movable plate 130 changes its position at the time of fitting the positioning pins 132 into the positioning sockets 145, such movement is detected by the detecting means 110. The detecting means 110 sends to the controller 11 a detection signal corresponding to a displacement of position between the preforming mold 72 and the full-forming support frame 84. In the controller 11, the displacement of position $R_{72\text{-}84}$ (an X-directional travel distance $X_{M72\text{-}84}$, a Y-directional travel distance $Y_{M72\text{-}84}$ and a rotation angle $\theta_{72\text{-}84}$) between the preforming mold 72 and the full-forming support frame 84 is calculated based on this detection signal.

Then, the controller 11 drives the movable means 112 based on the displacement of position $R_{72\text{-}84}$ to move the elevating arm 63 in a direction to cancel the displacement of position (in this case, the travel distance of the elevating arm 63 is expressed by $S_{72\text{-}84}$) In this case, the elevating arm 63 may be moved in a lump based on the above-mentioned displacement of position $R_{72\text{-}84}$, or may be moved sequentially, or may be moved under real-time control such as feedback control, based on detection signals from the detecting means 110.

Thus, the positioning of the elevating arm 63 to the movable plate 130 is carried out. In this state, the fixing mechanism locks (fixes) the movable plate 130 to the fixed flange 67. The displacement of position $R_{72\text{-}84}$ between the preforming apparatus 60 and the shuttle 86 and the travel distance $S_{72\text{-}84}$ indicating the movement of the elevating arm 63 based on the previous displacement of position, obtained in a manner as described above, are stored in the memory device in the controller 11. In a case that the previous displacement of position $R_{72\text{-}84}$ and travel distance $S_{72\text{-}84}$ have already been stored, these data are renewed with newly obtained displacement of position $R_{72\text{-}84}$ and travel distance $S_{72\text{-}84}$, namely, a learning-based treatment is carried out.

The displacement of position $R_{72\text{-}84}$ and travel distance $S_{72\text{-}84}$, thus learned, are used for positioning between the full-forming support frame 84 and the preforming mold 72 at the time of transferring a glass sheet G from the preforming apparatus 60 to the shuttle 86 in the next operation.

This learning-based treatment is not always limited to a renewing treatment but may be so constructed as to store mean values between the values obtained in the previous time and values obtained in the present time, or as to accumulate displacements of position $R_{72\text{-}84}$ and travel distances $S_{72\text{-}84}$ obtained in N times of detection and to store mean values thereof.

As described above, when the mutual position between the preforming mold 72 and the full-forming support frame 84 is determined with high precision by fitting the positioning pins 132 into the positioning sockets 145, the sucking action of the preforming mold 72 is canceled so that the previously formed glass sheet G is placed on the full-forming support frame 84. Since the mutual position between the preforming mold 72 and the full-forming support frame 84 is determined with high precision, the glass sheet G is positioned with high precision on the full-forming support frame 84 when it is placed from the preforming mold 72 on the full-forming support frame 84.

After the glass sheet G has been placed on the full-forming support frame 84, the shuttle 86 moves toward a direction of arrow mark Y1 in the Figure. In this case, the shuttle 66 works for placing a glass sheet G to be preformed next on the preforming support frame 64 via the flat mold 35.

Figure 8:
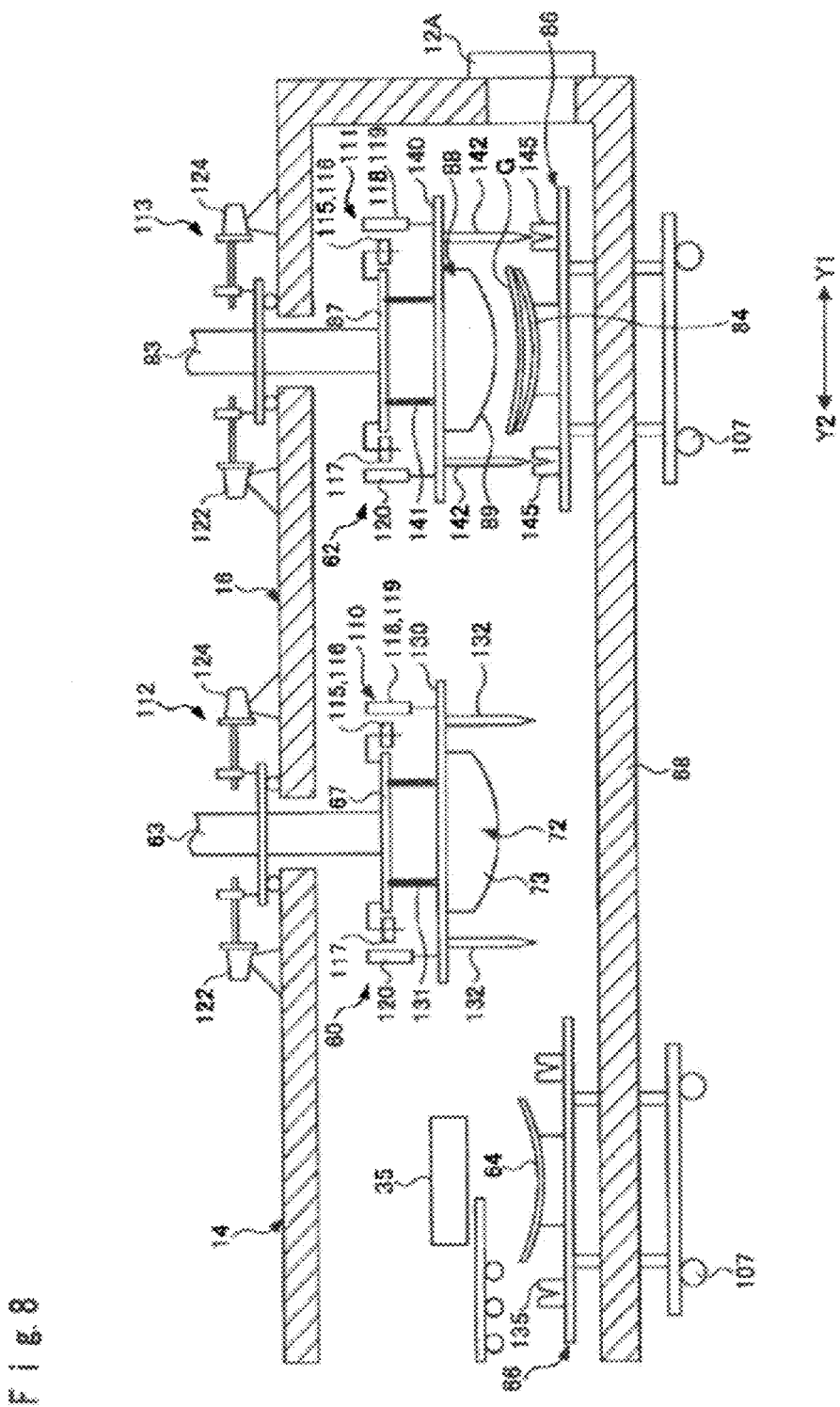
FIG. 8 is a view for explaining the treatment for determining the position between a mold and a frame (part one).

FIG. 8 shows a state that the shuttle 86 is moved to a position just below the full-forming mold 88. In this state, the glass sheet G is placed on the full-forming support frame 84 on the shuttle 86 wherein the glass sheet G is positioned on the full-forming support frame 84 with high precision.

A full-forming treatment to the glass sheet G in the full-forming apparatus 62 is carried out in the same manner as the preforming treatment to the glass sheet G in the preforming apparatus 60. Namely, while the shuttle 86 is moved to a position just below the full-forming mold 88, the controller 11 drives the movable means 113 based on the previously obtained displacement of position $R_{84\text{-}88}$ and travel distance $S_{84\text{-}88}$ between the full-forming support frame 84 and the full-forming mold 88 in the full-forming step, which have been obtained in the previous positioning treatment and stored in the memory device, so that the elevating arm 83 is moved (in a direction X1 or X2 and a direction Y1 or Y2) so as to cancel the previous displacement of position $R_{84\text{-}88}$ (a full-forming position correcting step).

Since the position between the positioning pins 142 and the positioning sockets 145 can previously be determined even in the full-forming step, it is possible to prevent a strong contact of the positioning pins 142 against the positioning sockets 145 or the abrasion of these members 142, 145. Description on the full-forming treatment is omitted because it is same as the preforming treatment.

Further, when the movable plate 140 changes its position with respect to the fixed flange 87 at the time of fitting the positioning pins 142 into the positioning sockets 145, the movement of the movable plate 140 can be detected by the detecting means 111 in the same manner as the before-mentioned preforming step. Accordingly a displacement of position $R_{84\text{-}88}$ between the full-forming mold 88 and the full-forming support frame 84 can be detected. Also, with the detecting means 111, the travel distance $S_{84\text{-}88}$ of the elevating arm 83 at the time of moving to a position to cancel the displacement of position, can be obtained.

Such displacement of position $R_{84\text{-}88}$ and travel distance $S_{84\text{-}88}$ are stored in the memory device of the controller 11. Accordingly, in the next full-forming step, the correction of displacement of the elevating arm 83 can previously be carried out based on these displacement of position $R_{84\text{-}88}$ and travel distance $S_{84\text{-}88}$ in the same manner as the before-mentioned preforming step. Therefore, the full-forming treatment can be performed with high precision and it is possible to prevent the abrasion of the positioning pins 142 and the positioning sockets 145 and so on.

A glass sheet G having subjected to a forming treatment in the forming furnace 16 is conveyed from the forming furnace 16 to the air-cooling tempering zone 18 (see FIGS. 1 and 2). The air-cooling tempering zone 18 comprises a quench shuttle 94, an air-cooling tempering device 96 and so on. The quench shuttle 94 is attached with a quench ring 97 (a conveyance support frame) at its left side and a catching member 98 at its right side.

The quench ring 97 is to receive a glass sheet G bent in the forming furnace 16 and it has a peripheral shape corresponding substantially to a shape of curvatures of the glass sheet G to be formed. At both sides of the quench ring 97, positioning sockets 155 are provided with high precision. These positioning sockets 155 have the same structure as the positioning sockets 145 provided on the shuttle 86. Accordingly, the positioning pins 142 can be fitted thereto with the descent of the full-forming mold 88 in a state that the quench shuttle 94 is at a position just below the full-forming mold 88, whereby the position between the full-forming mold 88 and the quench ring 97 is determined.

With the reciprocating movement of the quench shuttle 94 in directions Y1, Y2, the quench ring 97 reciprocates between a position just below the full-forming mold 88 (a receiving position) in the forming furnace 16 and a position for air-cooling/tempering (a conveyance position) at the air-cooling tempering device 96.

Figure 10:
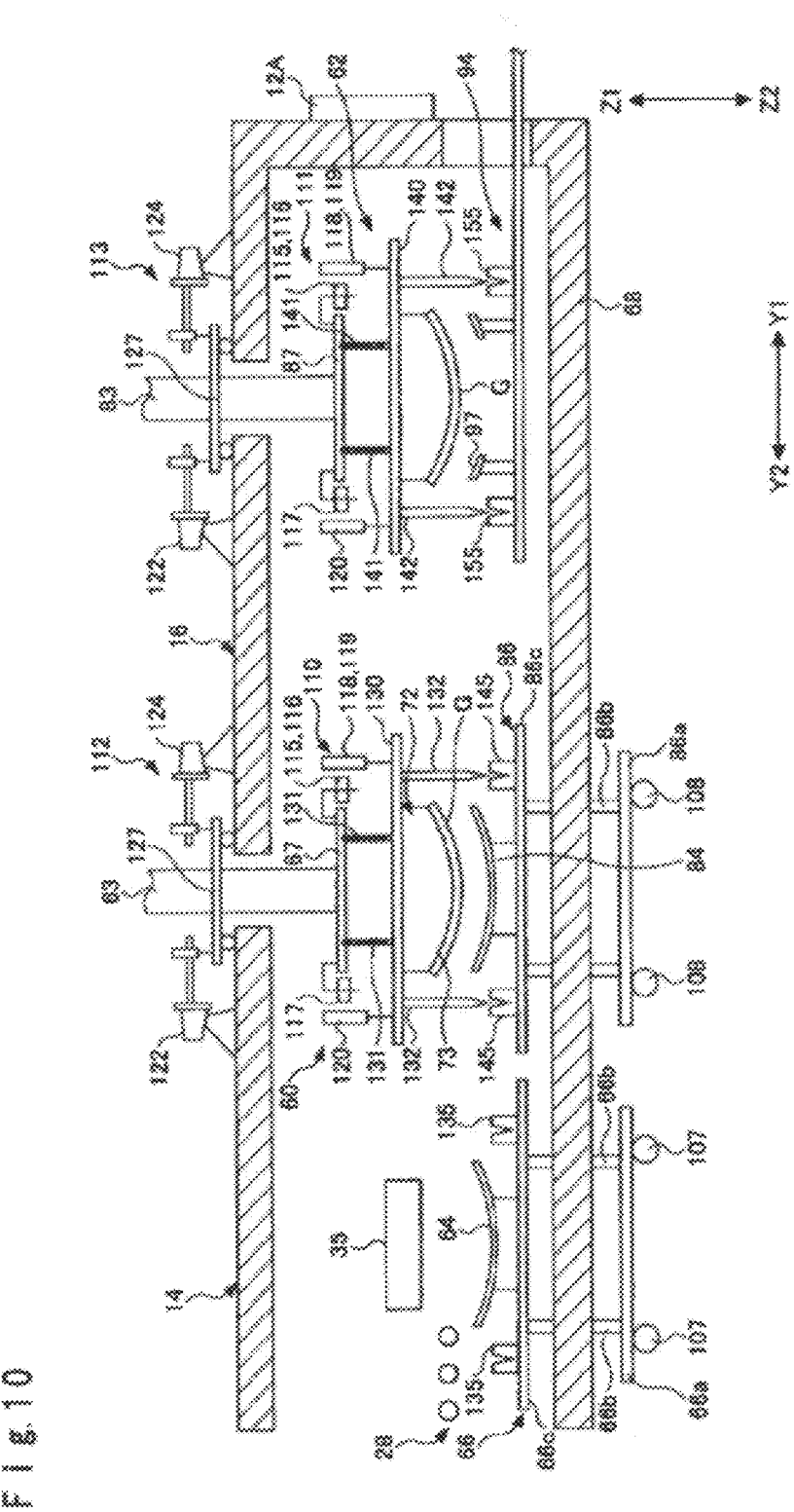
FIG. 10 is a view for explaining the treatment for determining the position between a mold and a frame (part three).

The glass sheet G formed to have a finally curved shape by full-forming is vacuum-sucked by the full-forming mold 88 to be taken from the full-forming support frame 84. In synchronism with this, a door 12A is opened and the quench shuttle 94 moves in a direction Y2. Then, the quench ring 97 enters into the forming furnace 16 and stops at a position just below the full-forming mold 88. FIG. 10 shows a state that the quench ring 97 is at a position just below the full-forming mold 88.

As well as the correction of a displacement of position between the preforming mold 72 and the full-forming support frame 84 and the correction of a displacement of position between the full-forming support frame 84 and the full-forming mold 88 as described before, the controller 11 stores in the memory device the displacement of position $R_{88-97}$ and the travel distance $S_{88-97}$ between the full-forming mold 88 and the quench ring 97, which have been obtained in the previous positioning treatment.

While the quench ring 97 moves to a position just below the full-forming mold 88, the controller 11 drives the movable means 113 based on the previously obtained displacement of position $R_{88-97}$ and the travel distance $S_{88-97}$ between the full-forming mold 88 and the quench ring 97, which have been obtained in the previous positioning treatment and stored in the memory device, so that the elevating arm 83 is moved (in a direction X1 or X2 and a direction Y1 or Y2) so as to cancel the previous displacement of position $R_{88-97}$ (a second transfer position correcting step).

Even in transferring the glass sheet G onto the quench ring, the position between the positioning pins 142 and the positioning sockets 155 can previously be determined. Accordingly, it is possible to prevent a strong contact of the positioning pins 142 to the positioning sockets 155 or abrasion of these members 142, 155. Description of transferring the glass sheet G onto the quench ring is omitted because such treatment is the same as the full-forming treatment and preforming treatment.

When the movable plate 140 changes its position with respect to the fixed flange 87 at the time of fitting the positioning pins 142 into the positioning sockets 155, the movement of the movable plate 140 can be detected by the detecting means 111 in the same manner as the cases of the full-forming treatment and preforming treatment whereby a displacement of position $R_{88-97}$ between the full-forming mold 88 and the quench ring 97 can be obtained. Also, a travel distance $S_{88-97}$ of the elevating arm 83 when it is moved to a position to cancel the displacement of position, can be obtained with the detecting means 111.

The displacement of position $R_{88-97}$ and travel distance $S_{88-97}$ are also stored in the memory device of the controller 11. Accordingly, the correction of displacement of position of the elevating arm 83 can previously be carried out at the time of next transfer of a glass sheet onto the quench ring, based on the displacement of position $R_{88-97}$ and travel distance $S_{88-97}$ in the same manner as the full-forming treatment and preforming treatment. Therefore, it is possible to conduct the positioning between the full-forming mold 88 and the quench ring 97 with high precision and to prevent abrasion occurring due to the contact of the positioning pins 142 to the positioning sockets 155.

The glass sheet G transferred onto the quench ring 97 is conveyed to the air-cooling tempering zone 18 out of the forming furnace 16, with the movement of the quench shuttle 94 in a direction of arrow mark Y1. In synchronism with this, the door 12A is closed. The air-cooling tempering zone 18 is provided with the air-cooling/tempering device 96, an air-floating device 104 and so on.

The air-cooling/tempering device 96 comprises an upper blow head 100 and a lower blow head 102 for jetting cooling air supplied from air blowers (not shown) to upper and lower surfaces of the glass sheet G. The glass sheet G being supported by the quench ring 97 is brought to an air-cooling/tempering position between the upper blow head 100 and the lower blow head 102, and then, it is air-cooled and tempered by cooled air jetted from the upper and lower blow heads 100, 102.

The pressure of cooled air from the lower blow head 102 is set to a pressure capable of supporting the glass sheet G in an air-floating state. Accordingly, the glass sheet G positioned at the air-cooling/tempering position is air-cooled and tempered in an air-floating state. During this, the quench shuttle 94 moves in a left direction (a direction Y2) in FIG. 2 to the conveyance position as described before.

The catching member 98 is for receiving the glass sheet G air-cooled and tempered in an air-floating state at the air-cooling/tempering position, and is provided with a plurality of frames on which the glass sheet G is placed. With the reciprocating movement of the quench shuttle 94 in directions Y1, Y2, the catching member 98 reciprocates between the air-cooling/tempering position (receiving position) and the inlet position (conveyance position) of the conveyance roller conveyer 20. The quench shuttle 94 reciprocates in a direction X by means of a horizontally moving device (not shown) such as chain-drive device, timing-belt-drive device or the like.

Accordingly, the glass sheet G which has undergone a full-forming treatment and has been conveyed out of the furnace by the quench ring 97 is cooled/tempered by the air-cooling/tempering device 96, and then, the glass sheet is received by the catching member 98 to be conveyed to the inlet of the conveyance roller conveyer 20. Thereafter, the glass sheet G is conveyed to an inspecting section or a packaging section at a downstream side by means of the conveyance roller conveyer 20.

Thus, according to the apparatus and method for bending a glass sheet in this embodiment, a glass sheet can be bent in a desired curved shape, and it is possible to prevent the collision between positioning pins 132 (142) and positioning sockets 135 (145, 155) and the abrasion of these members.

Figure 11:
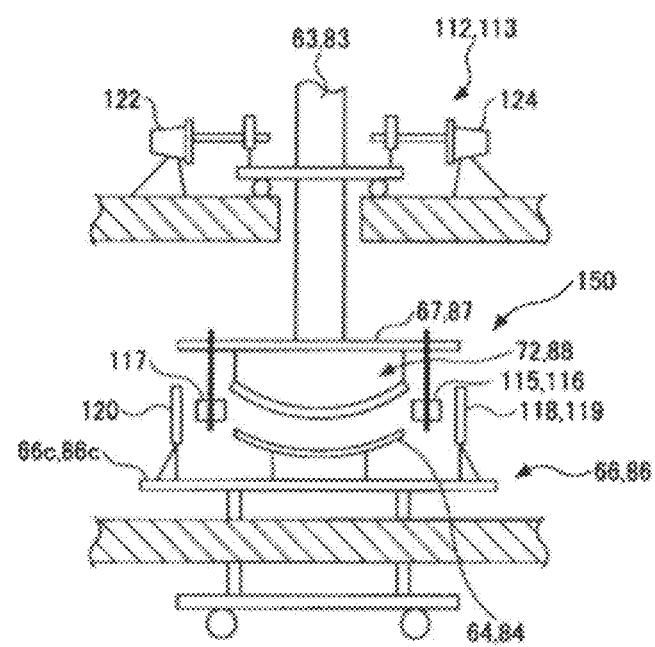
FIG. 11 is a view for explaining a modification of the preforming apparatus or the full-forming apparatus.

FIG. 11 shows another embodiment of the bending apparatus 10. In the bending apparatus 10 described with reference to FIGS. 1 to 10, the forming mold 72 (88) is fixed to the movable plate 130 (140), and the movable plate 130 (140) is suspended to the fixed flange 67 (87) with the chain 131 (414) so as to be movable.

In this modified embodiment, the forming mold 72 (88) is directly fixed to the fixed flange 67 (87) attached to the lower end portion of the elevating arm 63 (83). Further, sensors 115 to 117 constituting a detecting means 150 are fixed to the fixed flange 67 (87) together with the forming mold 72 (88). Sensing plates 118 to 120 constituting the detecting means 150 are fixed to the stage 66c (86c) of the shuttle 66 (86) together with the forming support frame 64 (84).

With such construction, when the movable means 112 (113) moves the elevating arm 63 (83), the forming mold 72 (88) is moved integrally whereby accuracy of movement can be improved. Further, since the positioning pins 132 (142) and the positioning sockets 135 (145) can be omitted, the number of component parts can be reduced. Further, since a displacement of position between the forming mold 72 (88) and the forming support frame 64 (84) can directly be detected without the interposition of movable plate 130 (140), accuracy in the positioning can further be increased.

Figure 9:
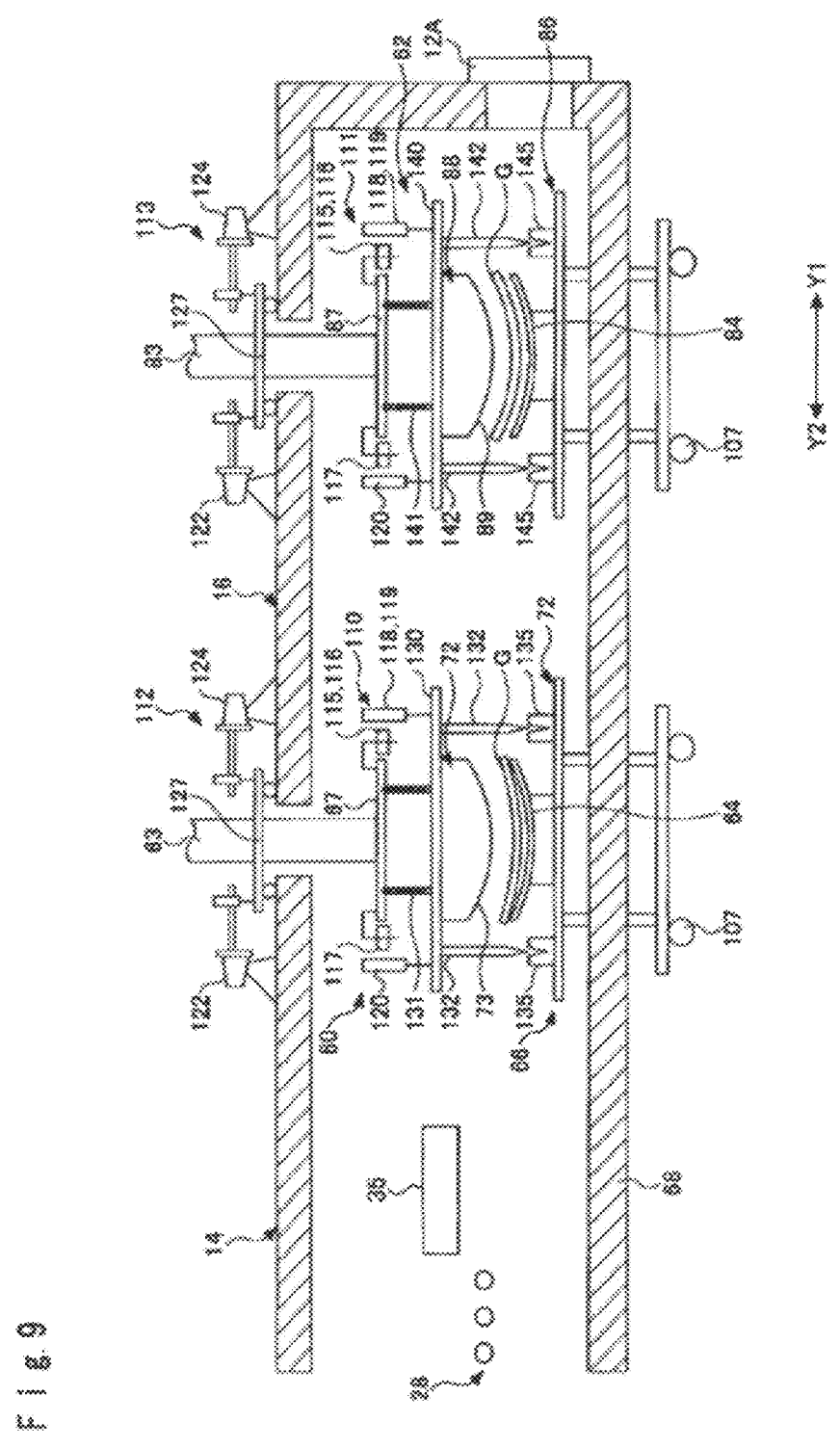
Figure 13:
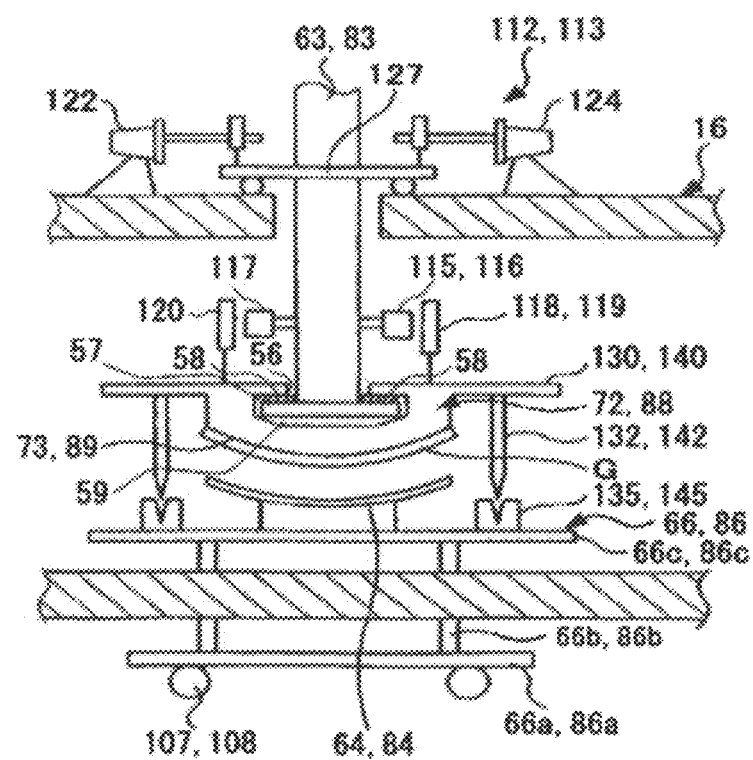
FIG. 13 is a view for explaining another modification of the preforming apparatus or the full-forming apparatus.

FIG. 13 shows another embodiment which is different from the structure of the bending apparatus 10 as shown in FIGS. 8 to 10 wherein the movable plate 130 (140) is suspended to the fixed flange 67 (87) with the chain 131 (141) or the structure as shown in FIG. 11. In this modified embodiment, the elevating arm 63 (83) is provided with an engaging flange 57 at its lower end portion. Further, the movable plate 130 (140) attached to the forming mold 72 (88) has at its center an opening 56 which is larger than the cross-sectional diameter of the elevating arm 63 (83) and smaller than the engaging flange 57, and the opening 56 is communicated with an engaging chamber 59 in the forming mold 72 (88). At a side of the opening 56, an insertion port which is larger than the engaging flange 57 is formed. Accordingly, the engaging flange 57 can be inserted from the insertion port together with the forming mold 72 (88) whereby the movable plate 130 (140) can be engaged with the engaging flange 57 in the opening 56.

A lubricating material 58 is disposed between the movable plate 130 (140) and the engaging flange 57. As the lubricating material, a slippery material is applied between the movable plate 130 (140) and the engaging flange 57. For example, a known lubricating material such as an iron alloy, a nickel alloy or the like usable for metal bearings may be used. Or, the lubricating material may be of a mechanical structure such as balls provided either on the movable plate 130 (140) or the engaging flange 57 so that the movable plate 130 (140) and the engaging flange 57 slip each other. The engaging chamber 59 is formed to have a tapered angle toward the bottom surface as shown in FIG. 13. In this embodiment, the movable plate 130 (140) and the engaging flange 57 are locked by means of a fixing mechanism to prevent their slippage prior to the descent of the elevating arm.

Sensors 115 to 117 constituting a detecting means are fixed to the elevating arm 63 (83). Further, sensing plates 118 to 120 constituting the detecting means are fixed to the movable plate 130 (140) together with the forming mold 72 (88). Positioning pins 132 (142) are fixed to the forming mold 72 (88), and positioning sockets 135 (145) are fixed to the stage 66c (86c) of the shuttle 66 (86) together with the forming support frame 64 (84).

In the bending apparatus having the above-mentioned structure, when the locking state of movable plate 130 (140) to the engaging flange 57 is canceled and the elevating arm 63 (83) starts descending by means of the movable means 112 (113), the positioning pins 132 (142) come to fit the positioning sockets 135 (145). In this case, when there is a displacement of fitting position, the forming mold 72 (88) shifts from the previous position so as to follow the displacement of fitting position. Since the forming mold 72 (88) is movable independent from the elevating arm 63 (83) because of the interposition of the lubricating material 58, the forming mold moves to the fitting position of the positioning pins 132 (142) and the positioning sockets 135 (145). The travel distance of the forming mold is detected properly by the detecting means and a detection signal corresponding to the detected travel distance is sent to the controller. The controller drives the movable means 112 (113) in a direction to cancel this displacement of position so that the elevating arm 63 (83) is moved to follow the movement of the forming mold 72 (88). With the movement of the elevating arm, it is possible to connect the elevating arm 63 (83) to the forming mold 72 (88) at a predetermined position on the forming mold 72 (88) and it is possible to maintain the posture of the forming mold 72 (88).

When the elevating arm 63 (83) descends further and the forming mold 72 (88) presses a glass sheet, it takes place a state that the forming mold 72 (88) is placed on the shuttle 66 (86). Then, the engagement between the movable plate 130 (140) and the engaging flange 57 is canceled. In this case, since the bottom surface of the engaging chamber 59 has a tapered structure, the engaging flange 57 contacts the tapered surface whereby the engaging flange 57 is restricted from moving. Namely, the engaging chamber 59 is so formed as to prevent the movement between the forming mold 72 (88) and the elevating arm 63 (83) at their engaging position. Accordingly, the elevating arm 63 (83) can be connected to the forming mold 72 (88) at a predetermined position on the forming mold even when the movable plate is ascended or descended in a state that the engagement is canceled. Thus, by providing such a structure that the engagement is canceled after the pressing, it is possible to eliminate an abnormal operation due to sticking of the movable plate 130 (140) to the engaging flange 57 even under elevated temperature in a heating furnace while maintaining highly accurate positioning.

Figure 14:
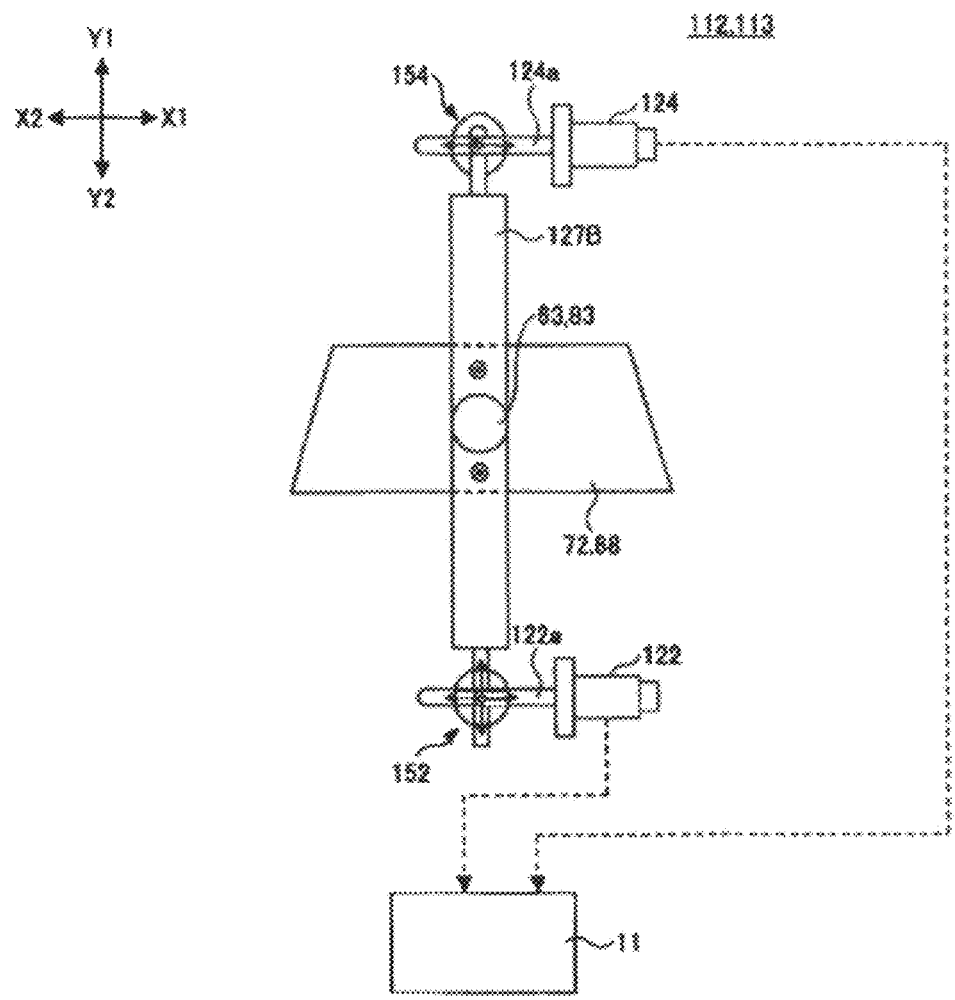
FIG. 14 is a view for explaining another modification of movable means provided in the preforming apparatus or the full-forming apparatus.

FIG. 14 shows another embodiment of movable means 112 and 113 provided in the preforming apparatus 60 and the full-forming apparatus 62 respectively. The movable means 112 (113) is constituted by two actuators 122, 124, a connection member 127B and so on. The driving shaft 122a of the actuator 122 is provided at its end portion with a sliding/rotating mechanism 152 capable of sliding in two directions and capable of rotating. This sliding/rotating mechanism 152 is capable of sliding in two directions of arrow marks X1, X2 and in two directions of Y1, Y2 in the Figure, and is connected to an end portion of the connection member 127B so as to be rotatable. The driving shaft 124a of the other actuator 124 is provided at its end portion with a sliding/rotating mechanism 154 capable of sliding in a direction and capable of rotating. This sliding/rotating mechanism 154 is capable of sliding in directions of arrow marks X1, X2 in the Figure, and is connected to the other end portion of the connection member 127B so as to be rotatable.

The connection member 127B is disposed between the sliding/rotating mechanism 152 and the sliding/rotating mechanism 154. However, the connection member 127B does not necessarily connect the sliding/rotating mechanisms 152, 154 but may be composed of members fixed to the elevating arm 63 (83) independently from the sliding/rotating mechanisms 152, 154.

The sliding/rotating mechanism 152 has the same structure as that shown in FIG. 12, and therefore, description thereof is omitted.

In the following description of the sliding/rotating mechanism, a servomotor is used for the actuator and a ball screw is used for the driving shaft. The structure of the sliding/rotating mechanism 154 is different from that of the sliding/rotating mechanism 152 in FIG. 12 in the point as follows. A guide block 203 and a metal block 208 are formed in one-piece so that they can not slide mutually in directions Y1, Y2. Namely, on actuation of the servomotor 124, the sliding/rotating mechanism 154 moves the end portion of the connection member 127B in directions Y1, Y2, however, it can not move this end portion in directions Y1, Y2. The other points of structure are the same, and it is possible to rotate the end portion of the connection member 127B depending on circumstances.

The movable means 112 (113) having the structure as described above moves the elevating arm 63 (83) only in directions X1, X2 and rotating. Namely, it can not perform the correction of position in directions Y1, Y2. However, the correction of position in directions Y1, Y2, i.e. a conveying direction, can be made by adjusting the travel distance of the shuttle 66 (86). Specifically, such correction is carried out as follows.

When the position in directions Y1, Y2 of the elevating arm 63 (83) is to be corrected, correction can be made by adjusting the travel distance of the shuttle 66 (86) mounting thereon the forming support frame 64 (84) on which a glass sheet is placed, without moving the elevating arm 63 (83) itself.

The position in directions X1, X2 of the elevating arm 63 (83) can be corrected as follows. When the servomotors 122, 124 act respectively on end portions of connection member 127B moving in the same direction, i.e., in a direction of arrow mark X1 or X2 in the Figure, the elevating arm 63 (83) also moves in a direction of arrow mark X1 or X2.

The position in a clockwise direction of the elevating arm 63 (83) can be corrected as follows. When the servomotor 122 moves the end portion of the connection member 127B in a direction of arrow mark X2 in the Figure and the servomotor 124 moves the other end portion of the connection member 127B in a direction of arrow mark X1, the end portion at a side of servomotor 122 of the connection member 127B slides in a direction Y1 and turns clockwise depending on circumstances, and the end portion at a side of servomotor 124 of the connection member 127B turns clockwise depending on circumstances, whereby the elevating arm 63 (83) rotates clockwise. In this case, the elevating arm 63 (83) shifts in a direction Y1. However, a change in position can be corrected by adjusting the travel distance of the shuttle 66 (86).

Further, the position in a counterclockwise direction of the elevating arm 63 (83) can be corrected as follows. When the servomotor 122 moves the end portion of the connection member 127B in a direction of arrow mark X1 in the Figure and the servomotor 124 moves the other end portion of the connection member 127B in a direction of arrow mark X2, the end portion at a side of servomotor 122 of the connection member 127B slides in a direction Y1 and turns counterclockwise depending on circumstances, and the end portion at a side of servomotor 124 of the connection member 127B turns counterclockwise depending on circumstances, whereby the elevating arm 63 (83) rotates counterclockwise. In this case, the elevating arm 63 (83) shifts in a direction Y1. However, a change in position can be corrected by adjusting the travel distance of the shuttle 66 (86).

Thus, with a combination of the basic movements described above, it is possible to move the elevating arm 63 (83) in a direction X1 or X2, or to rotate the same as desired. Accordingly, under such a condition that the fixed flange 67 (87) is fixed to the movable plate 130 (140) by means of the fixing mechanism, or under such a condition that the movable plate 130 (140) is fixed to the engaging flange 57 by means of the fixing mechanism in the embodiment shown in FIG. 13, it is possible to move the forming mold 72 (88) by moving the elevating arm 63 (83) with the movable means 112 (113).

The actuators 122, 124 having the structure as described above and the shuttles 66, 86 with the forming support frames 64, 84 on which a glass sheet is placed are adapted to be driven under control of controller 11. Accordingly, on the basis of a travel distance of the is movable plate 130 (140) with respect to the fixed flange 67 (87), or a travel distance of the movable plate 130 (140) with respect to the elevating arm 63 (83) in the embodiment shown in FIG. 13, which are detected by the detecting means 110 (111), the forming mold 72 (88) can be moved with use of the movable means 112 (113), and the travel distance of the shuttle 66 (86) can be adjusted. By employing the structure as described above, the structure of the movable means 112 (113) can be made compact.

INDUSTRIAL APPLICABILITY

According to the present invention, a displacement of position between a support frame and a forming mold can be corrected with high precision. Accordingly, this technique can be applied to bend a glass sheet, in particularly, it is useful as a method and an apparatus for bending a glass sheet like a plate-like material such as a window glass for automobiles.

The entire disclosure of Japanese Patent Application No. 2006-121039 filed on Apr. 25, 2006 including specification, claims, drawings and summary is incorporated herein by reference in its entirety.

What is claimed is:

1. A method for bending a glass sheet, comprising:
  a forming step which includes placing a glass sheet softened by heating between a forming support frame and a forming surface of a forming mold, and pressing the glass sheet with the forming support frame and the forming surface of the forming mold to bend the glass sheet in a predetermined curved shape; and
  a transferring step which includes holding the glass sheet of the predetermined curved shape on a forming mold and transferring the glass sheet from the forming mold to a conveyance support frame configured to support an edge portion of the glass sheet to convey to a next step,
  wherein the forming step and the transferring step are performed inside a furnace,
  the forming step includes correcting a forming position including correcting a displacement of a press position with respect to the forming support frame and the forming mold by moving the position of the forming mold at the time of pressing the glass sheet with the forming support frame and the forming mold inside the furnace,
  the transferring step includes correcting a transfer position including correcting a displacement of a transfer position of the glass sheet with respect to the forming mold and the conveyance support frame by moving the position of the forming mold at the time of transferring the glass sheet of a predetermined curved shape onto the conveyance support frame inside the furnace,
  the correcting a forming position includes retrieving the press position with respect to the forming support frame and the forming mold, memorized in a first memory device, to correct the position of the forming mold and detecting newly a displacement of press position thereby renewing the press position memorized in the first memory device,
  the correcting a transfer position includes retrieving the transfer position of the glass sheet with respect to the forming mold and the conveyance support frame, memorized in a second memory device, to correct the position of the forming mold and detecting newly a displacement of transfer position thereby renewing the transfer position memorized in the second memory device,
  the detecting newly a displacement includes detecting a displacement based on a position of a movable plate with respect to a flange, the movable plate being movable with respect to the flange while the movable plate is suspended from the flange in an unlocked state, and
  the correcting a forming position includes moving the forming mold to cancel the displacement detected based on the position of the movable plate and setting the forming position by fixing the movable plate to the flange at the position.

2. The method for bending a glass sheet according to claim 1, wherein the renewing the press position includes: detecting a displacement of the press position of the glass sheet by fitting pins provided in the forming mold to sockets provided in the forming support frame at the time of pressing the glass sheet with the forming support frame and the forming surface of forming mold; pressing the glass sheet against the forming surface of forming mold while the position of the forming mold is corrected; and memorizing a renewed press position in the first memory device, and the renewing the transfer position includes: detecting a displacement of transfer position of the glass sheet by fitting pins provided in the forming mold to sockets provided in the conveyance support frame at the time of transferring the glass sheet of the predetermined curved shape, held on the forming surface of forming mold, onto the conveyance support frame; transferring the glass sheet of the predetermined curved shape onto the conveyance support frame while the position of the forming mold is corrected; and memorizing a renewed transfer position in the second memory device.

3. The method for bending a glass sheet according to claim 1, wherein each of the correcting a forming position and the correcting a transfer position comprises correcting the position of the forming mold by controlling actuators connected to the forming mold at four positions thereof via each sliding mechanism capable of sliding in two directions perpendicular to each other to move and/or rotate the forming mold in a horizontal direction.

4. The method for bending a glass sheet according to claim 1, wherein each of the correcting a forming position and the correcting a transfer position comprises correcting the position of the forming mold by controlling a first actuator connected to a position in the forming mold at a side of a direction of a conveyed glass sheet via a sliding mechanism capable of sliding in two directions perpendicular to each other and a second actuator connected to a position in the forming mold at a side opposing the first actuator via a sliding mechanism capable of sliding in a direction perpendicular to the direction of conveyed glass sheet to move and/or rotate the forming mold in a direction perpendicular to the direction of the conveyed glass sheet, and the method further includes correcting the displacement of a component in the direction of the conveyed glass sheet by adjusting a stop position of the forming support frame or the conveyance support frame.

5. The method for bending a glass sheet according to claim 1, wherein the forming step is carried out plural times, and the conveyance support frame in the transferring step is used as a forming support frame in a next forming step so that a series of the forming step and the transferring step is repeated plural times.

6. The method for bending a glass sheet according to claim 1, wherein the movable plate is suspended in the unlocked state such that the movable plate is movable with respect to the flange while an elevating arm is descended downward.

7. A method for bending a glass sheet, comprising:
a heating step including softening a glass sheet by heating;
a preforming step including placing the softened glass sheet on a preforming support frame configured to support an edge portion of the glass sheet, and pressing the glass sheet against a forming surface of a preforming mold in a state of being placed on the preforming support frame to bend the glass sheet in a predetermined provisionally curved shape;
a full-forming step including holding the glass sheet of provisionally curved shape on the preforming mold, transferring the glass sheet onto a full-forming support frame for supporting an edge portion of the glass sheet, and pressing the glass sheet against a forming surface of full-forming mold in a state of being placed on a full-forming support frame to bend the glass sheet in a finally curved shape; and
a conveyance step including holding the glass sheet of finally curved shape on a full-forming mold, transferring the glass sheet onto a conveyance support frame for supporting an edge portion of the glass sheet, and conveying the glass sheet of the finally curved shape in a state of being placed on the conveyance support frame,
wherein the preforming step and the full-forming step are performed inside a furnace,
the preforming step includes:
correcting a preforming position including correcting a displacement of a press position with respect to the preforming support frame and the preforming mold by moving a position of the preforming mold at the time of pressing the glass sheet against the preforming mold inside the furnace, the correcting a displacement including correcting a displacement newly detected based on a position of a movable plate with respect to a flange, the movable plate being movable with respect to the flange while the movable plate is suspended from the flange in an unlocked state, and the correcting a preforming position including moving the preforming mold to cancel the displacement detected based on the position of the movable plate and setting the preforming position by fixing the movable plate to the flange at the position, and
the full-forming step includes:
correcting a first transfer position including correcting a displacement of a transfer position of the glass sheet with respect to the preforming mold and the full-forming frame by moving the position of the preforming mold at the time of transferring the glass sheet of the provisionally curved shape onto the full-forming support frame inside the furnace, and
correcting a full-forming position including correcting a displacement of a press position with respect to the full-forming support frame and the full-forming mold by moving a position of full-forming mold at the time of pressing the glass sheet of provisionally curved shape against the full-forming mold inside the furnace.

8. The method for bending a glass sheet according to claim 7, wherein the conveyance step includes correcting a second transfer position including correcting a displacement of a transfer position of the glass sheet with respect to the full-forming mold and the conveyance frame by moving the position of full-forming mold at the time of transferring the glass sheet of finally curved shape onto the conveyance support frame.

9. The method for bending a glass sheet according to claim 8, wherein the correcting a second transfer position includes retrieving the second transfer position of the glass sheet of finally curved shape with respect to the full-forming mold and the conveyance support frame, memorized in a memory device, to correct the position of the full-forming mold and detecting newly a displacement of a second transfer position thereby renewing the second transfer position memorized in the memory device.

10. The method for bending a glass sheet according to claim 8, wherein the correcting a second transfer position is performed while the glass sheet is maintained at a temperature at which the glass sheet is bent.

11. The method for bending a glass sheet according to claim 10, wherein the temperature is 650 to 720° C.

12. The method for bending a glass sheet according to claim 7, wherein the preforming step comprises pressing the glass sheet against the forming surface of the preforming mold, and the forming surface is formed such that a deformation volume of the glass sheet undergone preforming is from 20 to 80% of a deformation volume of the glass sheet of finally curved shape.

13. The method for bending a glass sheet according to claim 7, wherein the movable plate is suspended in the unlocked state such that the movable plate is movable with respect to the flange while an elevating arm is descended downward.

14. The method for bending a glass sheet according to claim 7, wherein the correcting a displacement of the press position with respect to the full-forming support frame and the full-forming mold includes correcting a displacement newly detected based on a position of a movable plate with respect to a flange, the movable plate is movable with respect to the flange while the movable plate is suspended from the flange in an unlocked state, and the correcting a full-forming position includes moving the full-forming mold to cancel the displacement detected based on the position of the movable plate and setting the full-forming position by fixing the movable plate to the flange at the position.

15. An apparatus for bending a glass sheet, comprising:
a forming unit having a forming support frame and a forming mold, the forming unit being configured to place a glass sheet softened by heating, between the forming support frame and the forming mold, and to press the glass sheet to bend the glass sheet in a predetermined curved shape;
a conveyance unit configured to convey the glass sheet of the predetermined curved shape, the conveyance unit having a conveyance support frame configured to hold thereon the glass sheet of the predetermined curved shape and to support an edge portion thereof; and
a furnace in which the forming support frame, the forming mold and the conveyance support frame are disposed,
wherein the forming unit includes
a forming position detecting unit configured to detect a displacement of a press position with respect to the forming support frame and the forming mold at the time of pressing the glass sheet against the forming mold inside the furnace,
a transfer position detecting unit configured to detect a displacement of a transfer position of the glass sheet with respect to the forming mold and the conveyance support frame at the time of transferring the glass sheet of the predetermined curved shape onto the conveyance support frame inside the furnace and
a movable unit configured to move and/or rotate the forming mold, and
the apparatus further comprises a control unit configured to control the movable unit in response to a displacement of a position detected by the forming position detecting unit to move and/or rotate the forming mold to cancel the displacement of the position of the glass sheet inside the furnace, the control unit being configured to control the movable unit in response to a displacement of a position detected by the transfer position detecting unit to move and/or rotate the forming mold to cancel the displacement of the position of the glass sheet inside the furnace, the forming position detecting unit being configured to newly detect a displacement based on a position of a movable plate with respect to a flange, the movable plate being movable with respect to the flange while the movable plate is suspended from the flange in an unlocked state, and the control unit being configured to control the movable unit to move the forming mold to cancel the displacement detected based on the position of the movable plate and set the forming position by fixing the movable plate to the flange at the position.

16. The apparatus for bending a glass sheet according to claim 15, wherein the control unit has a memory unit configured to memorize a displacement of the press position detected by the forming position detecting unit and a displacement of the transfer position detected by the transfer position detecting unit to move and/or rotate the forming mold on the basis of displacements of the position retrieved from the memory device.

17. The apparatus for bending a glass sheet according to claim 15, wherein the forming mold includes pins, and the forming support frame and the conveyance support frame respectively include sockets to be fitted with the pins.

18. The apparatus for bending a glass sheet according to claim 15, wherein the movable unit comprises actuators connected to the forming mold at four positions via sliding mechanisms capable of sliding in two directions perpendicular to each other.

19. The apparatus for bending a glass sheet according to claim 15, wherein the movable unit comprises a first actuator connected to a position in the forming mold at a side of a direction of a conveyed glass sheet via a sliding mechanism capable of sliding in a direction perpendicular to each other and a second actuator connected to the forming mold at a side opposing to the first actuator via a sliding mechanism capable of sliding in a direction perpendicular to the direction of the conveyed glass sheet.

20. The apparatus for bending a glass sheet according to claim 15, wherein forming unit are provided in plural stages and the conveyance support frame in the conveyance unit is used as the forming support frame to provide plural stages comprising a series of forming unit and conveyance unit.

21. The apparatus for bending a glass sheet according to claim 15, further comprising an elevating arm, wherein the movable plate is suspended in the unlocked state such that the movable plate is movable with respect to the flange while the elevating arm is descended downward.

22. An apparatus for bending a glass sheet, comprising:
a heating unit configured to soften a glass sheet;
a preforming unit configured to bend the glass sheet in a predetermined provisionally curved shape, the preforming unit comprising a preforming support frame configured to hold the softened glass sheet by supporting an edge portion thereof and a preforming mold configured to press the glass sheet held on the preforming support frame;
a full-forming unit configured to bend the glass sheet in a finally curved shape, the full-forming unit comprising a full-forming support frame configured to hold the glass sheet of the provisionally curved shape by supporting an edge portion thereof and a full-forming mold configured to press the glass sheet;
a conveyance unit configured to convey the glass sheet of a finally curved shape, the conveyance unit comprising a conveyance support frame configured to hold the glass sheet of the finally curved shape by supporting an edge portion thereof; and
a furnace in which the preforming support frame, the preforming mold, the full-forming support frame, the full-forming mold and the conveyance support frame are disposed, wherein the preforming unit further comprises
a preforming position detecting unit configured to detect a displacement of a press position with respect to the preforming support frame and the preforming mold at the time of pressing the glass sheet against the preforming mold inside the furnace,
a first transfer position detecting unit configured to detect a displacement of a transfer position of the glass sheet with respect to the preforming mold and the full-forming support frame at the time of transferring the glass sheet of provisionally curved shape onto the full-forming support frame inside the furnace, and
a preforming movable unit configured to move and/or rotate the preforming mold, and the full-forming unit further comprises
a full-forming position detecting unit configured to detect a displacement of a press position with respect to the full-forming support frame and the full-forming mold at the time of pressing the glass sheet of provisionally curved shape against the full-forming mold inside the furnace, and
a full-forming movable unit configured to move and/or rotate the full-forming mold, and wherein the apparatus further comprises: a preforming control unit configured to control the preforming movable unit in response to a displacement of a position detected by the preforming position detecting unit to move and/or rotate the preforming mold to cancel the displacement of the position of the glass sheet inside the furnace, the preforming control unit being configured to the preforming movable unit in response to a displacement of a position detected by the first transfer position detecting unit to move and/or rotate the preforming mold to cancel the displacement of the position of the glass sheet inside the furnace, the preforming position detecting unit being configured to newly detect a displacement based on a position of a movable plate with respect to a flange, the movable plate being movable with respect to the flange while the movable plate is suspended from the flange in an unlocked state, and the preforming control unit being configured to control the preforming movable unit to move the preforming mold to cancel the displacement detected based on the position of the movable plate and set the preforming position by fixing the movable plate to the flange at the position; and a full-forming control unit configured to control the full-forming movable unit in response to a displacement of a position detected by the full-forming position detecting unit to move and/or rotate the full-forming mold to cancel the displacement of the position of the glass sheet inside the furnace.

23. The apparatus for bending a glass sheet according to claim 22, wherein the full-forming unit includes a second transfer position detecting unit configured to detect a displacement of a transfer position of the glass sheet with respect to the full-forming mold and the conveyance support frame at the time of transferring the glass sheet of the finally curved shape onto the conveyance support frame, and
the full-forming control unit controls the full-forming movable unit in response to a displacement of a position detected by the second transfer position detecting unit to move and/or rotate the full-forming mold to cancel the displacement of the position.

24. The apparatus for bending a glass sheet according to claim 22, further comprising an elevating arm, wherein the movable plate is suspended in the unlocked state such that the movable plate is movable with respect to the flange while the elevating arm is descended downward.

25. The apparatus for bending a glass sheet according to claim 22, wherein the full-forming position detecting unit is configured to newly detect a displacement based on a position of a movable plate with respect to a flange, the movable plate is movable with respect to the flange while the movable plate is suspended from the flange in an unlocked state, and the full-forming control unit is configured to control the full-forming movable unit to move the full-forming mold to cancel the displacement detected based on the position of the movable plate and set the full-forming position by fixing the movable plate to the flange at the position.

26. An apparatus for bending a glass sheet, comprising:
a furnace;
means for conveying a glass sheet;
means for correcting a press position of the glass sheet when the glass sheet is pressed between a forming support frame and a forming mold inside the furnace;
means for pressing the glass sheet between the forming support frame and a forming mold to bend the glass sheet in a curved shape;
means for correcting a transfer position of the glass sheet when the glass sheet is transferred to the means for conveying the glass sheet inside the furnace; and
means for transferring the glass sheet from the means for pressing the glass sheet to the means for conveying the glass sheet,
wherein the means for correcting a press position comprises detecting means for detecting a displacement between the forming support frame and the forming mold based on a position of a movable plate with respect to a flange; movable means for moving the forming mold; and control means for controlling the movable means,
the movable plate is movable with respect to the flange while the movable plate is suspended from the flange in an unlocked state, and
the means for correcting a press position corrects the press position through the control means which controls the movable means to move the movable plate to cancel the displacement detected based on the position of the movable plate and sets the press position by fixing the movable plate to the flange at the position.

* * * * *